(12) United States Patent
Tsang

(10) Patent No.: US 9,280,042 B2
(45) Date of Patent: Mar. 8, 2016

(54) AUTOMATIC SWITCHING OF A MULTI-MODE PROJECTOR DISPLAY SCREEN FOR DISPLAYING THREE-DIMENSIONAL AND TWO-DIMENSIONAL IMAGES

(75) Inventor: Peter Wai Ming Tsang, Kowloon (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 423 days.

(21) Appl. No.: 13/422,758

(22) Filed: Mar. 16, 2012

(65) Prior Publication Data
US 2013/0242062 A1    Sep. 19, 2013

(51) Int. Cl.
| H04N 13/04 | (2006.01) |
| H04N 9/31 | (2006.01) |
| H04N 5/58 | (2006.01) |
| G03B 35/24 | (2006.01) |

(52) U.S. Cl.
CPC ............ *G03B 35/24* (2013.01); *H04N 13/0409* (2013.01); *H04N 13/0454* (2013.01); *H04N 13/0459* (2013.01)

(58) Field of Classification Search
CPC ..... H04N 13/00; H04N 13/0409; H04N 9/31; H04N 5/58
USPC .......................................................... 348/51
See application file for complete search history.

(56) References Cited

U.S. PATENT DOCUMENTS

| 5,315,377 | A | * | 5/1994 | Isono et al. ...................... 348/51 |
| 5,663,831 | A | * | 9/1997 | Mashitani et al. ............ 359/463 |
| 5,969,850 | A | | 10/1999 | Harrold et al. |
| 6,128,132 | A | * | 10/2000 | Wieland ............. G02B 27/2214 348/54 |
| 7,671,889 | B2 | | 3/2010 | Lipton et al. |
| 7,826,136 | B2 | | 11/2010 | Koo et al. |
| 7,830,579 | B2 | | 11/2010 | Saishu et al. |
| 7,834,903 | B2 | | 11/2010 | Saishu et al. |
| 7,843,544 | B2 | | 11/2010 | Kang |
| 8,356,905 | B2 | * | 1/2013 | Cossairt et al. .................. 353/97 |
| 9,041,771 | B2 | * | 5/2015 | Tsang .............................. 348/43 |
| 2002/0011969 | A1 | | 1/2002 | Lipton et al. |
| 2002/0036825 | A1 | * | 3/2002 | Lipton et al. .................. 359/463 |
| 2005/0219693 | A1 | * | 10/2005 | Hartkop et al. ............... 359/462 |

(Continued)

FOREIGN PATENT DOCUMENTS

| EP | 0540137 | 11/1996 |
| EP | 0833183 | 6/2004 |
| WO | 2007059054 A2 | 5/2007 |

*Primary Examiner* — Tracy Li
*Assistant Examiner* — Mohammad J Rahman
(74) *Attorney, Agent, or Firm* — Amin, Turocy & Watson, LLP

(57) ABSTRACT

Techniques for controlling switching of a barrier component for efficiently displaying various types of 2-D content and 3-D content on a projector screen are presented. A barrier control component detects an optical signal in a control region of the projector screen that is providing visual content to the barrier component, and identifies the type of visual content, such as 2-D content or 3-D autostereoscopic content, based on the optical signal. The barrier control component identifies a control signal based on the identified content type, and transmits the control signal to the barrier component via a wireline or wireless connection. The barrier component is controlled to automatically switch to a desired mode, such as 2-D mode or 3-D autostereoscopic mode, and employ a desired barrier pattern, in response to the received control signal. The barrier component is powered using a solar cell component that generates power using the optical signal.

34 Claims, 15 Drawing Sheets

(56) References Cited

U.S. PATENT DOCUMENTS

| | | | |
|---|---|---|---|
| 2005/0270645 A1* | 12/2005 | Cossairt | G02B 27/0087 359/463 |
| 2006/0126177 A1* | 6/2006 | Kim et al. | 359/465 |
| 2006/0139448 A1* | 6/2006 | Ha et al. | 348/51 |
| 2006/0284974 A1 | 12/2006 | Lipton et al. | |
| 2007/0158530 A1* | 7/2007 | Huang et al. | 250/206 |
| 2008/0266468 A1* | 10/2008 | Cossairt et al. | 348/759 |
| 2008/0309754 A1* | 12/2008 | Nayar | 348/46 |
| 2010/0002193 A1* | 1/2010 | Hines | 353/7 |
| 2010/0201790 A1* | 8/2010 | Son et al. | 348/53 |
| 2010/0289446 A1* | 11/2010 | Jang | 320/101 |
| 2010/0302050 A1* | 12/2010 | Kang et al. | 340/636.2 |
| 2011/0051239 A1* | 3/2011 | Daiku | 359/464 |
| 2011/0157330 A1* | 6/2011 | Bennett | G06F 3/14 348/54 |
| 2011/0157555 A1* | 6/2011 | Mashitani et al. | 353/7 |
| 2011/0187832 A1* | 8/2011 | Yoshida | 348/46 |
| 2012/0182334 A1* | 7/2012 | Ranieri | G02B 27/2214 345/694 |
| 2012/0314024 A1* | 12/2012 | Tsang | 348/43 |

* cited by examiner

AUTOMATIC SWITCHING OF A MULTI-MODE PROJECTOR DISPLAY SCREEN FOR DISPLAYING THREE-DIMENSIONAL AND TWO-DIMENSIONAL IMAGES

TECHNICAL FIELD

The subject disclosure relates generally to image displays, and in particular, to automatic switching of a multi-mode projector display screen for displaying three-dimensional and two-dimensional images.

BACKGROUND

Three-dimensional (3-D) visual effects have been around since the 1950s. Conventionally, 3-D visual effects have been realized in part by having the viewers wear glasses having a pair of polarized lens, a pair of chromatically opposite lens, or shutter glass spectacles. More recently, lens-free 3-D visual effects have been realized by using multiple cameras to capture multiple angles of a scene, wherein a monitor, employing a lenticular lens array, reconstructs the multiple views for display to the viewers. Such an arrangement is generally expensive and heavy. Another technique for producing lens-free 3-D visual effects is employing a parallax barrier that can reconstruct multiple views of a 3-D scene for display to viewers. The parallax barrier is relatively lower in cost and lighter in weight, as compared a monitor employing a lenticular lens array.

A 3-D autostereoscopic display based on parallax barrier can realize 3-D visual effects in part by having different pixels carrying different views of a 3-D scene. The 3-D autostereoscopic display is a technology that can combine multiple perspectives (e.g., multiple 2-D perspectives) of a 3-D scene into a single, integrated 2-D image. Using an autostereoscopic monitor, the single, integrated 2-D image can be displayed to a viewer such that each recorded view (e.g., 2-D image from each perspective) of the 3-D scene can be displayed to the viewer along its corresponding orientation. For instance, as the viewer moves from left to right (or right to left) in relation to the 3-D scene, the viewer can observe different views of the 3-D scene as if the viewer is looking at the actual 3-D environment depicted by the 3-D scene. In addition to displaying multi-view images to the viewer, the autostereoscopic techniques also can provide a 3-D sensation to the viewer as each of the viewer's eyes can perceive a slightly different image (e.g., different 2-D image from a different perspective) of the 3-D scene.

This 3-D technology has motivated numerous research works with the ultimate objective of developing different kinds of 3-D commercial products, such as television, photo frame, computer monitors, and toys, with 3-D technology. The concept also can be applied to display larger 3-D images via rear projection. This can be achieved by projecting the integrated images (e.g., integrated 2-D images that can form 3-D images) onto a projector screen which can be overlaid with a parallax barrier or a lenticular lens array.

However, when an ordinary 2-D image is displayed in this manner, the resolution can be significantly degraded (e.g., blurry) due in part to the ordinary 2-D image being negatively affected by the parallax barrier. In practice, it can be difficult to change the projector screen (e.g., rear projector screen) according to whether the displayed images are 2-D or 3-D in nature.

The degradation when displaying a projected ordinary 2-D image can be overcome with the use of an active parallax barrier in place of the passive parallax barrier. When ordinary 2-D content is displayed, the active parallax barrier can be totally, or substantially, transparent and have no effect on the projector screen, and, as a result, the ordinary 2-D content can be displayed without being degraded by the active parallax barrier. When 3-D content is displayed, the pattern on the active parallax barrier can be activated to become partially opaque, and different views of the 3-D images can be directed to their corresponding directions, based at least in part on the pattern.

However, conventionally the pattern on the active parallax barrier is activated manually, which can be cumbersome and inefficient. Further, enabling switching of an active parallax barrier to enable desired display of 3-D content and ordinary 2-D content can require modification of the original hardware circuit and/or software of the projector (or a device which drives the projector). It also may be necessary to provide a power supply to the active parallax barrier, and establish some kind of communication link (e.g., RF, infrared, etc.) between the active parallax barrier and the projection system.

Today, there is no way of efficiently controlling the display of 3-D content and ordinary 2-D content via the same display without the ordinary 2-D content appearing to be degraded, without a user having to manually switch the active parallax barrier on and off and/or without modification of the projection system (e.g., rear projection video projector). Further, conventional techniques for providing power to the active parallax barrier can be inefficient for a variety of other reasons. The above-described deficiencies of today's systems are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

The following presents a simplified summary of the disclosed subject matter in order to provide a basic understanding of some aspects described herein. This summary is not an extensive overview of the disclosed subject matter. It is intended to neither identify key or critical elements of the disclosed subject matter nor delineate the scope of the disclosed subject matter. Its sole purpose is to present some concepts of the disclosed subject matter in a simplified form as a prelude to the more detailed description that is presented later.

The systems, methods, and computer readable storage medium disclosed herein relate to controlling switching between multiple display modes to selectively process and display three-dimensional and two-dimensional visual images. Disclosed herein is a system that can include a barrier control component configured to dynamically generate a control signal in real time, based at least in part on a signal sensed from a control region of a projector screen component that presents video content received from a projector component, and transmit the control signal to a barrier component to facilitate controlling selection of a display mode and a corresponding barrier pattern that correspond to the control signal and a type of video content being presented, wherein the signal is indicative of the display mode and the corresponding barrier pattern to use to process the video content. The system also can include a sensor component configured to monitor the control region and sense the signal emitted from the control region.

Also disclosed herein is a method comprising the acts of: detecting a signal, which is associated with a visual image that is part of video content, in a control region associated with a projector screen that is presenting the visual image; selecting a control signal, of a plurality of available control signals, based at least in part on information contained in the signal; and dynamically transmitting the control signal in real time to a barrier component to facilitate controlling selecting a barrier pattern mode from a plurality of available barrier pattern modes and a corresponding barrier pattern from a plurality of available barrier patterns, to facilitate processing the visual image for presentation.

Further disclosed herein is a system that can include means for sensing a signal, which is associated with a video image that is part of video content, in a control region of a projector screen component in relation to presentation of the video image on the projector screen component. The system also can include means for dynamically transmitting a control signal, of a plurality of available control signals, in real time to a barrier component to facilitate controlling selecting a barrier pattern mode and a corresponding barrier pattern suitable for processing the video image from a plurality of available barrier pattern modes and a plurality of available barrier patterns, wherein the control signal is selected based at least in part on information contained in the signal.

Also disclosed herein is a computer readable storage medium comprising computer executable instructions that, in response to execution by a computing system, cause the computing system to perform operations. The operations comprising detecting a signal, associated with a video image of video content, in a control region of a projector screen in relation to presentation of the video image on the projector screen; selecting a control signal of a plurality of available control signals based at least in part on information contained in the signal; and transmitting the control signal in real time to a barrier component to facilitate selecting a barrier pattern mode and an associated barrier pattern from a plurality of available barrier pattern modes and a plurality of available barrier patterns, wherein the barrier pattern mode and the associated barrier pattern facilitate processing the video image in accordance with the signal, which corresponds to a type of video content of the video image.

The following description and the annexed drawings set forth in detail certain illustrative aspects of the disclosed subject matter. These aspects are indicative, however, of but a few of the various ways in which the principles of the disclosed subject matter can or may be employed, and the disclosed subject matter is intended to include all such aspects and their equivalents. Other advantages and distinctive features of the disclosed subject matter will become apparent from the following detailed description of the disclosed subject matter when considered in conjunction with the drawings.

DETAILED DESCRIPTION

Figure 1:
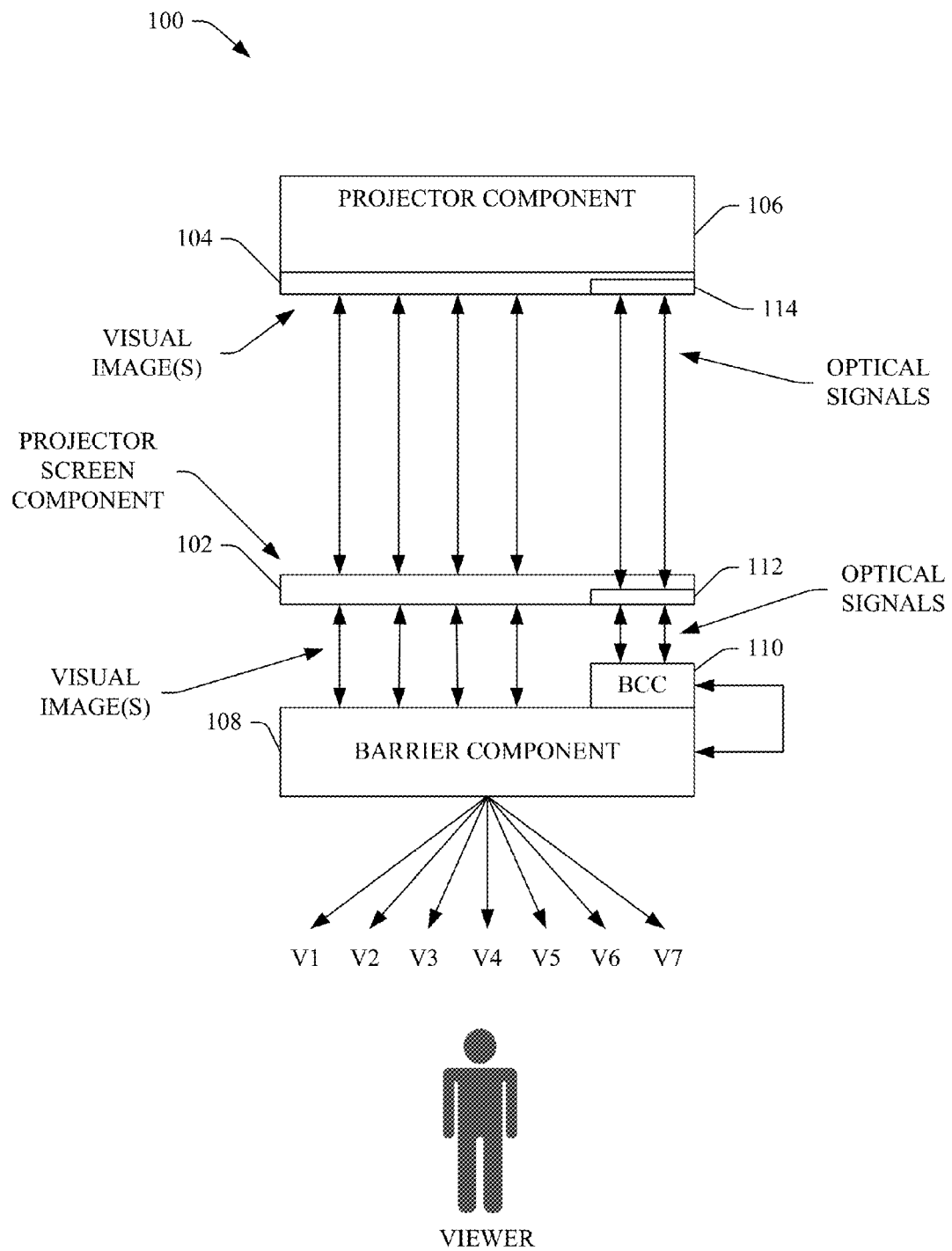
FIG. 1 illustrates a block diagram of an example system that can desirably control (e.g., automatically or dynamically) switching or selection of a multi-dimensional display mode of a barrier component (e.g., multi-mode barrier component) to facilitate presentation of a visual image(s) in a desired multi-dimensional display mode, in accordance with various aspects and embodiments of the disclosed subject matter.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

Conventional video processing of video content to produce three-dimensional (3-D) visual effects has reached the point where 3-D images can be viewed by viewers without the need for 3-D glasses to be worn by the viewers. For example, a 3-D autostereoscopic display based on a parallax barrier can realize 3-D visual effects in part by having different pixels carrying different views (e.g., different two-dimensional (2-D) views) of a 3-D scene. However, one significant deficiency of using such a parallax barrier is that, when ordinary 2-D content is passed through the parallax barrier, the 2-D content can be degraded (e.g., blurry) when displayed to the viewers.

Rear projection systems for displaying 3-D content are relatively rare. Existing rear projection systems for displaying 3-D content can typically be implemented by overlaying a parallax barrier, or a lenticular lens array on top of the projector screen. However, existing rear projection systems also experience the significant deficiency of using such a parallax barrier in that, when ordinary 2-D content is passed through the parallax barrier associated with the projector screen, the 2-D content can be degraded (e.g., blurry) when displayed to the viewers.

An active parallax barrier can be overlaid on the projector screen to enable the barrier to be transparent when 2-D content is being displayed in order to present the 2-D content without being degraded. For instance, the active parallax barrier can allow a user to manually switch the active parallax barrier on for the display of 3-D content and off for the display of ordinary 2-D content, so that the 2-D content can be clearly displayed. However, such arrangement can be inconvenient, particularly due to the parallax barrier having to be switched on and off manually by a user.

Alternatively, the active parallax barrier can be synchronized with an electrical signal which is extracted from the video. However, to do this, it can be necessary to modify the hardware and/or software of the projection system. Further, it can be necessary to supply electrical power to the active parallax barrier through a pair of conduction wires.

Today, there is no way of efficiently and effectively controlling the display of 3-D content and 2-D content via the same display without 2-D content appearing to be blurry and/or without a user having to manually switch the parallax barrier on and off and/or without modification of the projection system.

The disclosed subject matter includes techniques for controlling (e.g., automatically or dynamically in real time) switching of a barrier component (e.g., active parallax barrier component) to facilitate efficiently displaying various types of 2-D content and 3-D content, for example, on a projector screen (e.g., rear projection screen). A projector screen component can be employed to project or display visual images. In some implementations, the projector screen component can be or can include a rear projection screen. The projector screen component can be associated with a barrier component that can facilitate display of various types of video content, including ordinary 2-D content, 3-D stereoscopic content, and/or 3-D autostereoscopic content. The barrier component can be associated with (e.g., attached, adhered, or connected to), for example, a projector or display screen side of the projector screen component that presents the video content to viewers. The projector screen component and barrier component also can be associated with a barrier control component that can control (e.g., automatically or dynamically in real time) the barrier component to switch the barrier component between different display modes (e.g., 2-D mode, 3-D stereoscopic mode, or 3-D autostereoscopic mode) depending in part on the type of video content being projected or displayed on the projector screen component, to facilitate desirably projecting or displaying the different types of video content on the projector screen component. The combination of the barrier control component, the barrier component, and/or the projector screen component can form a 3-D screen adapter that can process or adapt different types of video content, including normal 2-D content and enhanced 2-D content, to desirably present normal 2-D content, 3-D stereoscopic content, and/or 3-D autostereoscopic content, depending in part on the type of video content received by the projector screen component from the projector component (e.g., rear-projection video projector system) and information (e.g., optical signals) associated with the video content.

In some implementations, one or more respective signals (e.g., optical signals) can be embedded in a signal region contained in each of one or more images (e.g., normal or enhanced 2-D images) of video content (e.g., sequence of video images). A projector component can project the one or more images on a projector screen component. The projector screen component can include a control region in a portion of the projector screen. The control region can be used to present the signal contained in a visual image to facilitate controlling processing and displaying of visual images. When the visual image is projected on the projector screen component, the signal can be presented (e.g., displayed or projected) in the control region of the projector screen component.

A barrier control component can detect the signal(s) (e.g., optical signal having a specified optical pattern, optical signal having or providing a specified number of data bits that correspond to a specified data value based at least in part on the respective data values of the respective data bits) in the control region as the visual image is presented on the projector screen component. In some implementations, the barrier control component can include a sensor component that can include a sensor array (e.g., a subset of light sensors) that can detect the signal in the control region. The sensor component can be configured to face and be aligned with, or otherwise associated with, the control region of the projector screen component so that the sensor component can detect the signals communicated (e.g., transmitted, emitted) from the control region in relation to presentation of the visual images on the projector screen component. The barrier control component can identify the type of visual content (e.g., 2-D content, 3-D stereoscopic content, or 3-D autostereoscopic content) being presented on the projector screen component, based at least in part on the detected signal (e.g., data value associated with (e.g., represented by) the optical signal, visual pattern of the optical signal, etc.).

In accordance with additional or alternative embodiments, the signal transmitted by the projector component and/or received by the projector screen component can be an audio signal having a specified frequency (e.g., audio signal that is above or below the audio frequency range of humans (e.g., above 20 kHz or below 20 Hz)). The sensor component of the barrier control component can detect the audio signal associated with the visual image as the visual image is being projected or displayed on the projector screen component. The barrier control component can identify the type of visual content (e.g., 2-D content, 3-D stereoscopic content, or 3-D autostereoscopic content), based at least in part on the detected audio signal (e.g., the frequency of the specified audio signal).

In some implementations, the barrier control component can identify a control signal based at least in part on the detected signal and/or the identified visual content type. The barrier control component can transmit the control signal to the barrier component via a wireline or wireless communication connection. In response to receiving the control signal, the barrier component can switch (e.g., automatically or dynamically in real time) to (or remain in) or select (e.g., automatically or dynamically in real time) a specified display mode, such as 2-D mode, 3-D stereoscopic mode, or 3-D autostereoscopic mode, wherein there can be respective barrier pattern modes and corresponding barrier patterns that can be utilized in the respective display modes to facilitate desirably presenting 2-D content or different types of 3-D content to a viewer (e.g., presenting 2-D content without blurriness, presenting 3-D stereoscopic content or 3-D autostereoscopic content with the respective 3-D visual characteristics).

In accordance with various aspects, the control signal can facilitate application of a corresponding control voltage to the barrier component, wherein different control signals can correspond to different control voltages that can correspond to different display modes. The corresponding control voltage can be applied to the barrier component to facilitate selecting the corresponding barrier pattern mode and/or barrier pattern to utilize in processing the received visual image to present the processed visual image in accordance with the selected display mode. For instance, when the video content is normal 2-D content, the barrier pattern mode selected can be a transparent barrier pattern that passes through the received 2-D video content without further processing to facilitate displaying the normal 2-D content without the blurriness that is otherwise typically encountered in conventional display systems using an active barrier. When the video content is enhanced 2-D content (e.g., 2-D content comprising a plurality of 2-D images that represent respective portions of a 3-D scene or image), the barrier pattern mode and/or barrier pattern selected in response to the control signal can be one of a plurality of partially opaque 3-D barrier patterns (e.g., 3-D stereoscopic barrier pattern, 3-D autostereoscopic barrier pattern, etc.) that can receive the enhanced 2-D content and can convert the enhanced 2-D content to produce video content that reconstructs the 3-D scene (also referred to herein as the 3-D object scene), and that produced video content can be presented to a viewer via the projector screen component as processed through the selected barrier pattern of the barrier component.

In some implementations, the sensor array of the barrier control component can include a subset of solar cells that can be associated with the control region. The subset of solar cells can detect and/or be illuminated by the optical signal to facilitate controlling switching of display modes and/or can convert the light energy of the optical signal into electrical energy to generate power based at least in part on the optical signal. The barrier control component can include a power supply component, and the power generated by the subset of solar cells can be transferred to the power supply component. The power supply component can store the power in a battery component and/or can provide some or all of the generated power to other components of the barrier control component and/or components (e.g., barrier component, projector screen component) associated with the barrier control component to at least partially power operation of the barrier control component, barrier component, and/or projector screen component. The combination of the barrier control component, barrier component, and/or projector screen component typically can be expected to consume a relatively small amount of power, and the power generated by the subset of solar cells can be sufficient to meet the power demands of the combination of the barrier control component, barrier component, and/or projector screen component.

In accordance with various other embodiments, the barrier control component, barrier component, and/or projector screen component can be associated with an external power supply. The barrier control component, barrier component, and/or projector screen component can share a same power supply(ies) (e.g., external power supply or power supply component) or can use one or more respective power supplies.

In accordance with various embodiments, the projector screen component, the barrier component, and barrier control component can be integrated as a stand-alone unit that can exist with no external electrical connection to another device (e.g., projector component, external power system, etc.). In some embodiments, the barrier control component can be a stand-alone unit, which can be adhered, attached, or placed in proximity to the barrier component and/or projector screen component such that the sensor component of the barrier control component can face and be aligned with, or otherwise associated with, the control region of the projector screen component so that the barrier control component can detect the signals communicated (e.g., transmitted, emitted) from the control region in relation to presentation of the visual images on the projector screen component.

The disclosed subject matter, by integrating the barrier control component and barrier component with the projector screen component, and operating as more fully disclosed herein, can control selection of various display modes to desirably present (e.g., display, project) various types of 2-D content and 3-D content to a viewer. Further, the disclosed subject matter does not require modification of the hardware or software of the projection system (e.g., projector component). Also, no electrical connection is required between the projection system and the integrated combination of the barrier control component, barrier component, and the projector screen component.

The disclosed subject matter can be applied to existing 2-D projections systems. The disclosed subject matter also can increase or improve the ease, flexibility, and/or scalability in producing image and video content, which may comprise a mixture (e.g., combination) of 2-D materials and 3-D materials. For example, a content producer can generate a signal (e.g., video signal) that can facilitate switching between a 2-D display mode and a 3-D display mode according to the signal contained in a region (e.g., signal region in a non-prominent part) of the visual image.

Turning to the figures, FIG. 1 illustrates a block diagram of an example system 100 that can desirably control (e.g., automatically or dynamically) switching or selection of a multi-dimensional display mode of a barrier component (e.g., multi-mode barrier component) to facilitate presentation of a visual image(s) in a desired multi-dimensional display mode, in accordance with various aspects and embodiments of the disclosed subject matter. In an aspect, the system 100 can comprise a projector screen component 102 that can display or present video content (e.g., movie, television show, video, photograph, etc.) and/or audio to a viewer perceiving or observing the projector screen component 102. In accordance with various embodiments, the projector screen component 102 can be or can comprise a projector or display screen, such as, for example, a rear projection screen, that can be structured to receive visual images 104 from a projector component 106 (e.g., placed behind the projector screen component 102 in relation to a viewer(s) positioned in front of the projector screen component 102) and present the visual images 104 to a viewer(s). The visual images 104 can be, for example, normal 2-D images, or enhanced 2-D images that can be processed to display 3-D content. The projector component 106 can provide (e.g., present, emit, project, etc.) the visual images 104 to the projector screen component 102. The projector screen can be constructed of a flexible material(s) (e.g., fabric, plastic film, etc.), semi-rigid material(s), or rigid material(s). The projector screen also can have a suitable coating (e.g., optical coating, diffusion coating, neutral coating, etc.) that can facilitate the presentation or reproduction of visual images 104 by the projector screen.

In certain other embodiments, the projector screen component 102 can be, or can be part of, a television, computer monitor, a video display device (e.g., digital video disc (DVD) player, digital video player or recorder, etc.), a mobile phone (e.g., cellular phone), electronic book, netbook, digital photo frame, electronic gaming device, or another electronic device (e.g., electronic toy) capable of displaying visual images. As some examples, the display screen of the projector screen component 102 can be a liquid crystal display (LCD), a light emitting diode (LED) display, a combination LCD-LED display, a plasma display (e.g., plasma display panel (PDP)), a digital light processing (DLP) display, a cathode ray tube (CRT) display, or other type of display screen that can display video content (e.g., visual images 104 that have been processed or remain unprocessed).

The projector screen component 102 can present normal 2-D content, or present enhanced 2-D content that can be further processed or enhanced to be converted or presented as 3-D content (e.g., video content comprising a reconstructed 3-D scene) of a specified type (e.g., stereoscopic 3-D content, autostereoscopic 3-D content, etc.) by a barrier component 108, which can be associated with (e.g., attached, connected, or adhered to; overlaid on) the projector screen component 102, as more fully disclosed herein. With regard to 3-D content, for a particular visual image 104 of enhanced 2-D content, there can be 2 or more 2-D views (e.g., 2, 3, 4, 5, 6, 7, or more views) that together make up the 3-D image scene. The multiple 2-D images of the 3-D image scene can be rendered into a single 2-D image (e.g., single enhanced 2-D image).

When the enhanced 2-D content is received from the projector component 106 and presented by the projector screen component 102, the barrier component 108 can process the enhanced 2-D content for presentation as a 3-D image (e.g., 3-D object image), wherein the enhanced 2-D content can be passed through a corresponding barrier pattern (in a corresponding barrier pattern mode) that can direct the respective illuminating pixels associated with respective views of the multiple views, which make up the 3-D image scene, to proceed along a direction corresponding to the view of the 3-D image scene such view represents.

The projector screen component 102 can be associated with (e.g., in proximity to and presenting video content to) the barrier component 108. For instance, the barrier component 108 can be placed on a front side of the projector screen component 102, wherein the front side of the projector screen component 102 is a side of the projector screen component 102 on which a viewer(s) can view video content.

The barrier component 108 can process received visual images 104 (e.g., video, digital photographs, etc.), such as normal 2-D content or enhanced 2-D content (e.g., which can be processed or converted to 3-D content of a specified type) to present the normal 2-D content or present the 3-D content in a specified 3-D content form, in accordance with a specified display mode of a plurality of available display modes (e.g., available barrier pattern modes) of the barrier component 108. The barrier component 108 can be a multi-mode active barrier component (e.g., comprising an active parallax barrier) or another type of multi-mode barrier component that can include one or more 2-D display modes for processing and/or presenting normal 2-D content, and one or more 3-D display modes for processing and/or presenting 3-D content based at least in part on received enhanced 2-D content. In an embodiment, the barrier component 108 can be or can comprise a liquid crystal polarizer (LCP) or prism LCP (PLCP) that can employ, at various times, a specified barrier pattern, of a plurality of available barrier patterns, in a specified barrier pattern mode, based at least in part on the type of video content being presented to the viewer. In some implementations, the 3-D video content output from and presented by the barrier component 108 can be viewed by the viewer lens free, that is, without the viewer having to wear 3-D glasses (e.g., 3-D glasses with polarized lens, chromatically opposite lens, or shutter glass).

In accordance with various aspects and embodiments, to facilitate desired presentation of video content, whether 2-D content or 3-D content, the system 100 can include a barrier control component (BCC) 110 that can control (e.g., automatically or dynamically in real time) switching of the barrier component 108, as more fully disclosed herein. The real time control can be on the order of seconds (e.g., performing selection or switching within 1 second, 2 seconds, 3 seconds, . . . ), milliseconds (ms) (e.g., performing selection or switching within 1 ms, 2 ms, 3 ms, . . . ), or less, for example. In an aspect, the projector screen component 102 can comprise a control region 112, of a specified size (e.g., spatial size, specified number of pixels), that can be formed in a portion of the projector screen. The projector screen component 102 can provide (e.g., present, generate, display, etc.) a signal via the control region 112, wherein the signal can be, for example, an optical signal (e.g., optical signal having an optical (e.g., light) pattern, optical signal having or providing a specified number of data bits that can correspond to a specified data value based at least in part on the respective data values of the respective data bits, etc.).

The projector component 106 can provide (e.g., project or present) visual images 104 to the projector screen component 102 for presentation by the projector screen component 102. The visual images 104 provided by the projector component 106 can contain the signal(s), for example, embedded in a signal region 114 of the visual images 104. For instance, a visual image 104 can include or have embedded therein a signal in a signal region 114 of the visual image 104 that can correspond in location to the control region 112 of the projector screen component 102. When the projector component 106 provides the visual images 104 to the projector screen component 102, the signal(s) of the visual images 104 can be contained or presented (e.g., projected or displayed) in the control region 112 of the projector screen component 102.

A signal can be one of a plurality of available signals, wherein respective signals can correspond to respective types of multi-dimensional video content and/or respective types of display modes and/or respective types of barrier pattern modes or barrier patterns. For example, there can be a first signal that can correspond (e.g., be mapped to) normal 2-D content, a second signal that can correspond to a first type of 3-D content (e.g., 3-D stereoscopic content, wherein the presented video content can be one type of enhanced 2-D content that can be processed or converted to produce the 3-D stereoscopic content), or a third signal that can correspond to a disparate type of 3-D content (e.g., 3-D autostereoscopic content, wherein the presented video content can be a disparate type of enhanced 2-D content that can be processed or converted to produce the 3-D autostereoscopic content), although it is to be appreciated that there can be other types of 2-D content or 3-D content as well as other types of signals.

In accordance with various aspects, there can be a signal contained or presented in the control region 112 for each visual image 104 of a piece of video content, for one visual image 104 of a plurality of visual images of a 3-D image or scene associated with video content, or only for specified visual images 104 of the video content. For example, a visual image 104 can comprise a signal to facilitate an initial selection or a change in selection of a display mode of the available multiple display modes, while the video content is being presented. As another example, a signal can be included in a specified number of visual images 104 of video content so that if, for any reason, the barrier control component 110 does not detect the signal in the control region 112 in relation to display of one visual image, the barrier control component 110 can detect the signal in one or more of the other visual images 104 that contain the signal as those visual images 104 are presented on the projector screen component 102. Additionally or alternatively, the signal can be included in visual images 104 of a sequence of visual images periodically to facilitate periodic presentation of the signal in the control region 112.

In another aspect, when a signal of a plurality of available signals is being embedded in a signal region 114 of a visual image(s) 104 to facilitate selecting a corresponding display mode of the barrier component 108, the signal can be contained in a signal region 114 of one or more visual images 104 that are at or near (e.g., immediately prior) to the time the desired display mode selection is desired to occur, such that the selection or switching to the desired display mode can occur at, or at least substantially near, the time the visual image(s) 104, for which the desired display mode is desired, is to be presented as an output from the barrier component 108 to the viewer. Such timing of embedding the signal in the signal region 114 of a visual image 104 can account for a delay (if any) between the time the signal is detected and the time the display mode is selected.

When a signal is only embedded in certain video images 104 of video content and presented in the control region 112 of the projector screen component 102, upon detection of the signal, the barrier control component 110 can identify and select a corresponding control signal (e.g., a control signal that can correspond to the detected signal). The barrier control component 110 can transmit the corresponding control signal to the barrier component 108 to facilitate controlling the barrier component 108 to select the display mode corresponding to the control signal. In some implementations, the barrier control component 110 can continuously maintain transmission of the same control signal over multiple visual images 104. In other implementations, the barrier control component 110 can communicate a control signal to the barrier component 108 and afterwards can discontinue transmission of the control signal (e.g., in response to a communication from the barrier component 108 indicating that the desired display mode has been selected and implemented), which can reduce power consumption by the barrier control component 110. The barrier component 108 can continue to operate in that desired display mode (e.g., corresponding to the control signal), regardless of whether it continues to receive the control signal from the barrier control component 110, until the barrier component 108 receives a different control signal from the barrier control component 110. If a different control signal is received, the barrier component 108 can switch to a different display mode in accordance with the different control signal.

As an additional or alternative embodiment, a signal transmitted in relation to a visual image 104 from the projector component 106 or associated component (e.g., speakers that are associated with projector component 106) can be an audio signal having a specified frequency (e.g., audio signal that is above or below the audio frequency range of humans (e.g., above 20 kHz or below 20 Hz)) that can be detected by the barrier control component 110. The barrier control component 110 can identify the type of visual content, based at least in part on the detected audio signal (e.g., the frequency of the specified audio signal).

In another aspect, the barrier control component 110 can be positioned in relation to the control region 112 so that a sensor component (e.g., sensing means) of the barrier control component 110 can be facing and aligned with the control region 112. The barrier control component 110, utilizing the sensor component, can monitor or scan information, such as the signal, being emitted from or presented by the control region 112 in relation to presentation of the video content on the projector screen component 102.

During the monitoring or scanning, the barrier control component 110 can detect (e.g., automatically or dynamically in real time) the signal presented (e.g., emitted) from the control region 112 of the projector screen component 102. The barrier control component 110 can analyze and identify the signal as being one particular signal of the plurality of available types of signals, based at least in part on the information in the detected signal. The barrier control component 110 can identify the type of visual content and/or the desired display mode (and/or desired barrier pattern mode and/or barrier pattern) for such video content, based at least in part on the type (e.g., pattern type) or data value of the identified signal. For example, the respective signals (e.g., optical signals) can be mapped to corresponding types of visual content and/or corresponding display modes (and/or desired barrier pattern mode and/or barrier pattern). The barrier control component 110 can analyze the mapping associated with a particular received signal to identify the type of visual content or desired display mode (and/or desired barrier pattern mode and/or barrier pattern) for such content.

In another aspect, the barrier control component 110 can identify and select (e.g., automatically or dynamically, in real time) a control signal of a plurality of types of control signals, based at least in part on the identified video content type or signal type. For example, the mapping of respective signals (e.g., received optical signals from the control region) to corresponding types of visual content and/or corresponding display modes (and/or desired barrier pattern mode and/or barrier pattern) can further include mapping to corresponding control signals respectively associated with the corresponding types of visual content and/or corresponding display modes. In still another aspect, the barrier control component 110 can transmit the control signal to the barrier component 108 via a wireline or wireless communication connection between the barrier control component 110 and barrier component 108.

In response to the received control signal, the barrier component 108 can be controlled (e.g., automatically or dynamically, in real time) to automatically switch to (or remain in) or select a specified display mode, such as 2-D mode, 3-D stereoscopic mode, or 3-D autostereoscopic mode, wherein there can be corresponding barrier pattern modes and/or barrier patterns that can be utilized in the respective display modes to facilitate desirably presenting 2-D content or 3-D content to a viewer (e.g., presenting 2-D content without blurriness, presenting 3-D stereoscopic content or 3-D autostereoscopic content with the respective 3-D visual characteristics). To select or apply a particular barrier pattern to video content, a specified voltage, which can correspond to the selected display mode and particular barrier pattern mode and/or barrier pattern, can be applied by the barrier component 108 to one or more electrodes or other electronic components that can facilitate selection of the particular barrier pattern mode and/or barrier pattern. With the desired barrier pattern mode and/or barrier pattern selected and applied, the barrier component 108 can receive the visual images 104 (e.g., standard 2-D content, enhanced 2-D content for conversion to 3-D content) provided to the projector screen component 102 and can pass or transmit the received visual images 104 through the selected barrier pattern in the selected barrier pattern mode.

It is to be appreciated and understood that a barrier pattern typically can have more than one mode, such as, for example, a transparent mode and a partially opaque mode. The transparent mode can be employed to have the barrier pattern be transparent so that it can pass normal 2-D video content through without affecting the 2-D video content to preserve visual quality. The partially opaque mode can be one of a number of different barrier pattern types, as more fully disclosed herein, and enhanced 2-D video content can be passed through the partially opaque barrier pattern to convert the enhanced 2-D video content into 3-D video content (e.g., video content comprising a reconstructed 3-D scene). Further, there can be a plurality of different barrier patterns that can be utilized by the barrier component 108, wherein for example, the different barrier patterns can employ respective partially opaque barrier patterns that can be used to process respective types of enhanced 2-D content when in a specified partially opaque mode (in addition to being able to pass though 2-D content when in transparent barrier pattern mode).

If the video content is normal (e.g., standard) 2-D content, the selected barrier pattern mode can be a transparent barrier pattern mode and the 2-D content can be passed through such the selected barrier pattern in such mode without the 2-D content being affected by such barrier pattern. The normal 2-D content can be presented as an output by the barrier component 108 for viewing by a viewer. If, for example, the video content is enhanced 2-D content that can be converted to 3-D stereoscopic content, the selected barrier pattern mode (and selected barrier pattern) can be a stereoscopic-type barrier pattern mode, wherein the barrier pattern can comprise or be in the form of repeated columns of regularly (e.g., evenly) spaced vertical strips to facilitate display of the two respective views that make up the 3-D image to the viewer; and the enhanced 2-D content (e.g., stereoscopically enhanced 2-D content) can be passed through the stereoscopic-type barrier pattern to convert the enhanced 2-D content to 3-D stereoscopic content, wherein the barrier component 108 using the stereoscopic-type barrier pattern can direct each illuminating pixel of the visual image to proceed along a direction that can correspond to the view of the 3-D image scene such view represents. In an aspect, the 3-D stereoscopic content, which can comprise 2 views (e.g., two 2-D views) that make up the 3-D image, can be presented as an output by the barrier component 108 for viewing by a viewer.

As another example, if the video content is enhanced 2-D content (e.g., autostereoscopically enhanced 2-D content) that can be converted to 3-D autostereoscopic content, the selected barrier pattern mode (and selected barrier pattern) can be an autostereoscopic-type barrier pattern mode, wherein the barrier pattern can comprise or be in the form of a plurality of slanted opaque strips which can be repetitive and/or regularly spaced (e.g., a repetitive sequence of regularly (e.g., evenly) spaced slanted strips) to facilitate display of the multiple (e.g., 3, 4, 5, 6, 7, or more) views that make up the 3-D image to the viewer; and the enhanced 2-D content can be passed through the autostereoscopic-type barrier pattern to convert the enhanced 2-D content to 3-D autostereoscopic content, wherein the barrier component 108 using the autostereoscopic-type barrier pattern can direct each illuminating pixel of the visual image to proceed along a direction that can correspond to the respective view of the 3-D image scene such view represents. The 3-D autostereoscopic content, which can comprise a specified number of respective views (e.g., respective 2-D views) that make up the 3-D image, can be presented as an output (e.g., views 1 through 7 (V1 through V7) as depicted in FIG. 1) by the barrier component 108 for viewing by a viewer. It is to be appreciated and understood that the above example barrier patterns are just a few of the various types of barrier patterns that can be employed in accordance with the disclosed subject matter, and all such various barrier pattern types are contemplated for use with the disclosed subject matter.

In accordance with some embodiments, the barrier control component 110, projector screen component 102, and barrier component 108 can be combined (e.g., connected, attached, etc.) to form a stand-alone unit, which can contain its own power supply (e.g., not explicitly shown in FIG. 1; as more fully disclosed herein, for example, in FIG. 3), and does not require an external electrical connection (although, as desired, can have an external electrical connection). In accordance other embodiments, the barrier control component 110 can be a stand-alone unit, which can be adhered, attached, or placed in proximity to the barrier component 108 such that the barrier control component 110 is aligned with the control region 112 of the projector screen component 102, and associated visual images 104, so that the barrier control component 110 can detect the signals (e.g., optical signals) communicated (e.g., presented, emitted) by or from the control region 112.

The disclosed subject matter, by using the barrier control component 110 to automatically and/or dynamically control the display mode of and barrier pattern selection by the barrier component 108 in real time, can more efficiently and desirably display 2-D content and 3-D content, without the 2-D content being degraded by a barrier pattern, without requiring manual switching between display modes or barrier patterns when the type of video content changes, and without requiring modification (or at least without requiring significant modification) of the projector screen component 102, projector component 106, or barrier component 108, in contrast to conventional projection or display systems. The disclosed subject matter also is relatively inexpensive and thus is a cost effective solution for processing and presenting 2-D and 3-D content. Further, the barrier control component 110 can consume a relatively low amount of power during operation and thus can be a cost effective and power efficient solution for processing and presenting 2-D and 3-D content.

Figure 2:
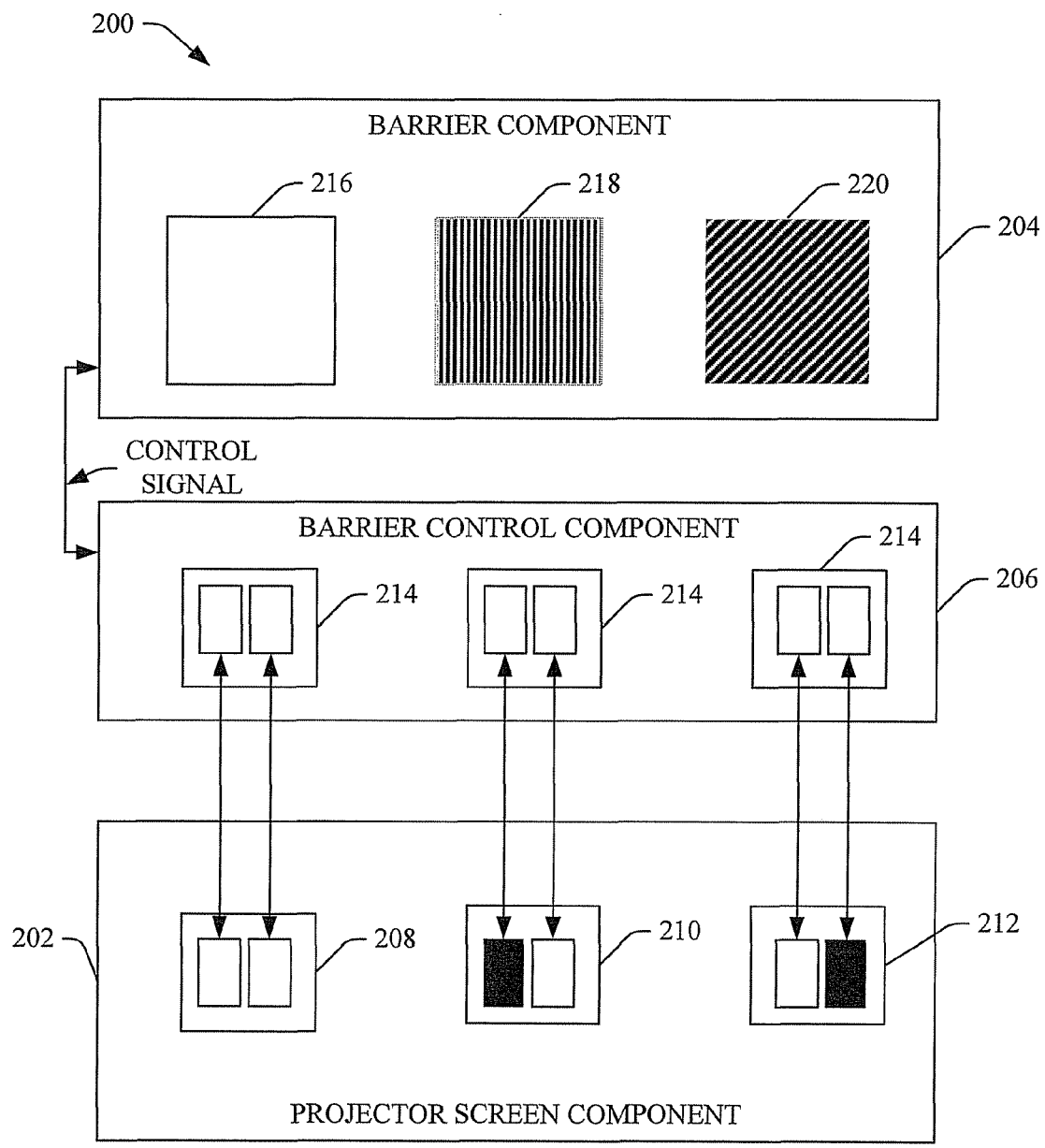
FIG. 2 depicts a diagram of an example system that can employ respective optical signals to facilitate controlling selection of respective barrier patterns to facilitate desirable display of multi-dimensional video content in accordance with various aspects and embodiments.

FIG. 2 depicts a diagram of an example system 200 that can employ respective optical signals to facilitate controlling selection of respective barrier patterns to facilitate desirable display of multi-dimensional video content in accordance with various aspects and embodiments. In an aspect, the system 200 can include a projector screen component 202, barrier component 204, and barrier control component 206 that each can be the same as or similar to, and/or can comprise the same or similar functionality as, respective components (e.g., respectively named components), as more fully disclosed herein.

In an aspect, the projector screen component 202 can include a projection or display screen that can comprise a control region (e.g., 112), wherein an optical signal (e.g., light signal) of a plurality of available optical signals can be presented (e.g., transmitted, emitted). The plurality of available optical signals can include, for example, a first optical signal 208 (e.g., transparent or 2-D-indicator optical signal) that can comprise a first light pattern, wherein the first light pattern (e.g., comprising 2 pixels) can comprise 2 bits of data, and wherein the 2 pixels can be respectively set (e.g., turned on to emit light, turned off so no light is emitted; set to a first wavelength to be a first indicator, set to a second wavelength to be a second indicator; etc.) to form the first light pattern resulting in the 2 bits of data being set to a specified data value (e.g., 00 (or 11)) to indicate that video content is 2-D content; a second optical signal 210 (e.g., 3-D stereoscopic-indicator optical signal) that can comprise a second light pattern, wherein the second light pattern (e.g., comprising 2 pixels) can comprise 2 bits of data, and wherein the 2 pixels can be respectively set to form the second light pattern thereby resulting in the 2 bits of data being set to a different specified data value (e.g., 10) to indicate that video content is 3-D stereoscopic content; and a third optical signal 212 (e.g., 3-D autostereoscopic-indicator optical signal) that can comprise a third light pattern, wherein the third light pattern (e.g., comprising 2 pixels) can be respectively set to form the third light pattern thereby resulting in the 2 bits of data being set to still another specified data value (e.g., 01) to indicate that video content is 3-D autostereoscopic content. It is to be appreciated and understood that, while 2 pixels and 2 bits of data are being employed in this example system 200, the disclosed subject matter is not so limited, as, in accordance with other embodiments, the control region (e.g., 112) also can employ less than 2 pixels or 2 bits of data (e.g., use 1 pixel or 1 bit of data, for instance, when there are only two barrier pattern modes, such as a transparent barrier pattern mode for 2-D content and a 3-D type barrier pattern mode for 3-D content, available) or more than 2 pixels or 2 bits of data (e.g., use 3 pixels or 3 bits of data, for example, when there is a total number of available barrier pattern modes that is greater than 4 and less than 9).

The control region (e.g., 112) can be or can comprise a light producing means or light emitting means that can transmit or output optical signals comprising light, which can be in the visible range of humans or can be outside the visible range of humans. The control region can produce and present different optical signals comprising different light patterns to facilitate selection of a barrier pattern mode (e.g., transparent mode, a first-type of partially opaque mode, a second-type of partially opaque mode, etc.) to use to process video content, based at least in part on the type of video content being presented by the projector screen component 202.

In another aspect, the barrier control component 206 can comprise a sensor component 214 that can include a sensor array (e.g., comprising light-sensing sensors), which can be aligned with, and can monitor or scan, the control region of the projector screen component 202. The sensor component 214, utilizing the sensor array, can detect the optical signals (e.g., 208, 210, 212) being presented by the control region of the projector screen component 202. The barrier control component 206 can analyze a detected optical signal and identify the type of optical signal, type of video content, type of barrier pattern, and/or type of display mode associated with the detected optical signal to facilitate automatically and dynamically controlling switching or selection of the display mode and corresponding barrier pattern in real time, as more fully disclosed herein. The sensor component 214 can comprise, for example, a sensor array comprising a specified number of sensors that can correspond to the number of pixels or bits of optical data (e.g., a sensor for each bit of data) that can be presented by the control region of the projector screen component 202.

In some embodiments, the sensor component 214 can include one or more solar cells that can detect or receive the optical signals (e.g., light signals) provided (e.g., presented) by the control region. The one or more solar cells can process (e.g., absorb, transform) the optical signals to generate electrical power that can be provided to the barrier control component 206, barrier component 204, and/or projector screen component 202 to power some or all of these components. In some implementations, the sensor array can include the one or more solar cells, wherein the one or more solar cells can be used as sensors to detect an optical signal to facilitate identifying a corresponding control signal, and also can be used to generate power by receiving and processing the optical signals. In other implementations, the sensor array can use other types of sensors (e.g., light sensors), in addition to or as an alternative to solar cells, to detect an optical signal to facilitate identifying a corresponding control signal.

In still another aspect, the barrier component 204 can comprise a specified number of barrier pattern modes that can respectively correspond to the available display modes of the barrier component 204. The specified number of barrier pattern modes can include, for example, a first barrier pattern mode 216, a second barrier pattern mode 218, and a third barrier pattern mode 220, wherein the first barrier pattern mode 216 can be associated with a transparent barrier pattern that can pass through video content (e.g., 2-D content) without affecting or altering the video content, the second barrier pattern mode 218 can be associated with a stereoscopic-type barrier pattern that can process input video content (e.g., enhanced 2-D video content comprising stereoscopic images) to generate a specified number (e.g., 2) of 3-D stereoscopic images of a 3-D image scene as an output, as more fully disclosed herein, and the third barrier pattern mode 220 can be associated with an autostereoscopic-type barrier pattern that can process input video content (e.g., enhanced 2-D video content comprising autostereoscopic images) to generate a specified number of 3-D autostereoscopic images of a 3-D image scene as an output, as more fully disclosed herein.

Figure 3:
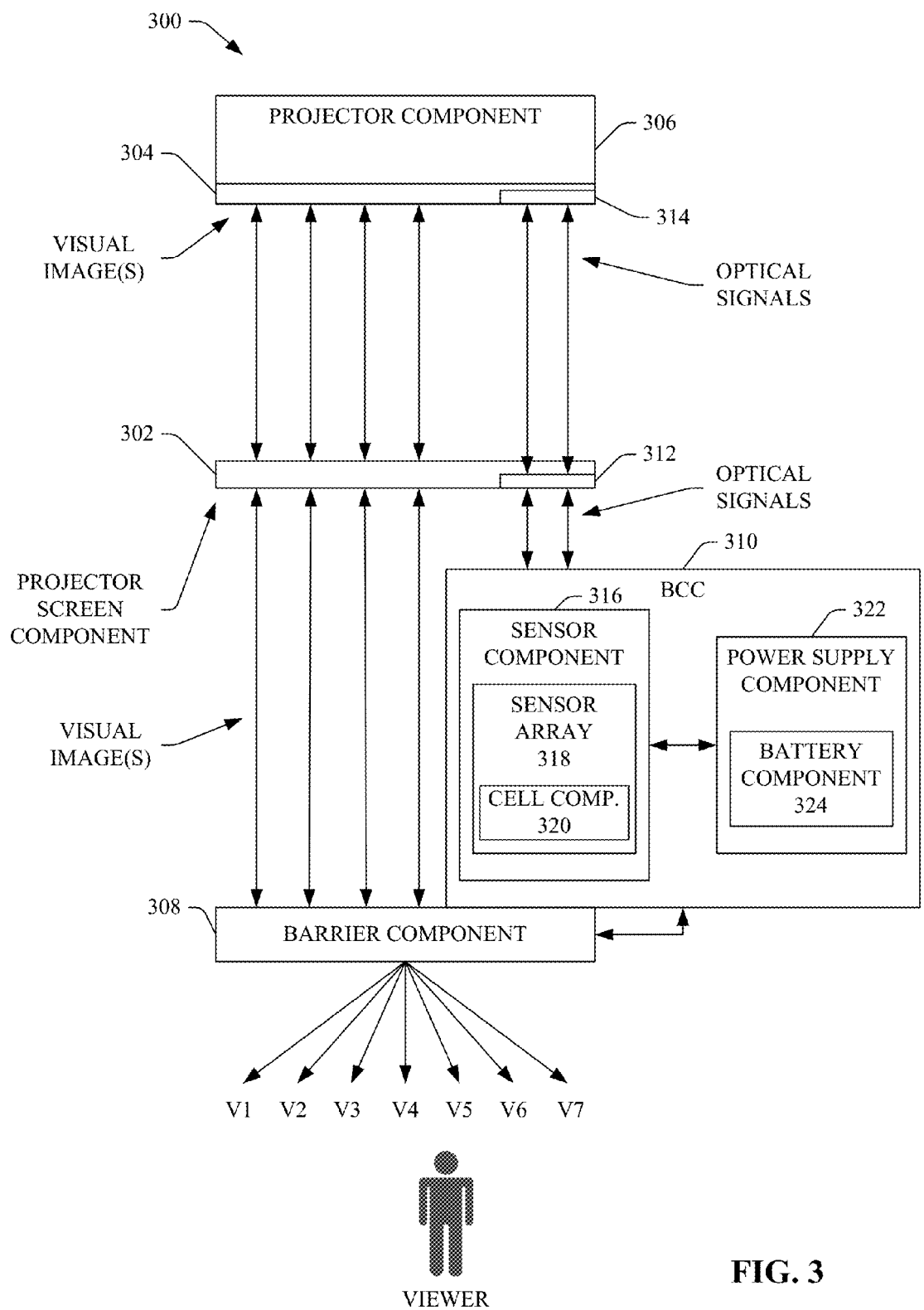
FIG. 3 illustrates a block diagram of an example system that can generate and provide power to facilitate desirably controlling switching or selection of a multi-dimensional display mode of a barrier component to facilitate presentation of a visual image(s) in a desired multi-dimensional display mode, in accordance with various aspects and embodiments of the disclosed subject matter.

FIG. 3 illustrates a block diagram of an example system 300 that can generate and provide power to facilitate desirably controlling (e.g., automatically or dynamically) switching or selection of a multi-dimensional display mode of a barrier component to facilitate presentation of a visual image (s) in a desired multi-dimensional display mode, in accordance with various aspects and embodiments of the disclosed subject matter. The system 300 can include a projector screen component 302 that can receive visual images 304 from a projector component 306. The projector screen component 302 can be associated with a barrier component 308 and barrier control component 310 that can facilitate controlling the presentation (e.g., projection, display) of the visual images 304 to a viewer(s) in response to detecting a signal(s) in a control region 312 of the projector screen component 302. A signal region 314 in a visual image 304 can provide a signal (e.g., optical signal) to the control region 312 when the visual image 304 is provided (e.g., projected, presented) to the projector screen component 302 by the projector component 306. The barrier control component 310 can include a sensor component 316 that can include a sensor array 318 (e.g., comprising light-sensing sensors and/or solar cells), which can be aligned with, and can monitor or scan, the control region 312 of the projector screen component 302 to detect optical signals from the visual images 304 that are presented in the control region 312. These components of the system 300 can each be the same as or similar to, and/or can comprise the same or similar functionality as, respective components (e.g., respectively named components), as more fully disclosed herein.

In some embodiments, the sensor array 318 of the sensor component 316 can comprise a cell component 320 (cell comp. 320) that can include one or more solar cells (e.g., photovoltaic cells) that can receive or detect light, including optical signals, from the visual images 304 presented in the control region 312. The one or more solar cells of the cell component 320 can convert the light energy into electrical energy, for example, through a photovoltaic effect process, or indirectly by first converting the light energy into heat energy and converting the heat energy to electrical energy. The cell component 320 can include other electronic circuitry that can be used to transfer the power generated by the cell component 320 to other components, such as, for example, other components of the barrier control component 310 (e.g., power supply component 322), the barrier component 308, and/or the projector screen component 302. In some implementations, a solar cell can be used as a light sensor to detect and identify the optical signals in the control region 312. In other implementations, a solar cell can be used to detect light for use in generating electrical power, while other light detecting means (e.g., light sensors) can be used to detect and identify the optical signals in the control region 312. The light detecting means (e.g., solar cell/light sensor, and/or other light sensor) can be arranged to face the control region 312 to facilitate detecting the optical signals of the visual images 304 as they are presented in the control region 312.

The barrier control component 310 also can include a power supply component 322 that can store power in a battery component 324, which can include one or more batteries (e.g., re-chargeable or replaceable batteries). The power supply component 322 can provide power to various components of the barrier control component 310, barrier component 308, and/or projector screen component 302. The power supply component 322 can be electrically and/or communicatively connected to the sensor component 316, and can receive power generated by the cell component 320, and can store that power in the battery component 324.

In other embodiments, the barrier control component 310 can have an external power supply that can be separate from the power supply component 322 (or can displace the power supply component 322) and can provide power to the barrier control component 310, and/or the barrier component 308 and/or projector screen component can be associated with an external power supply that can provide power to the respective components.

Figure 4:
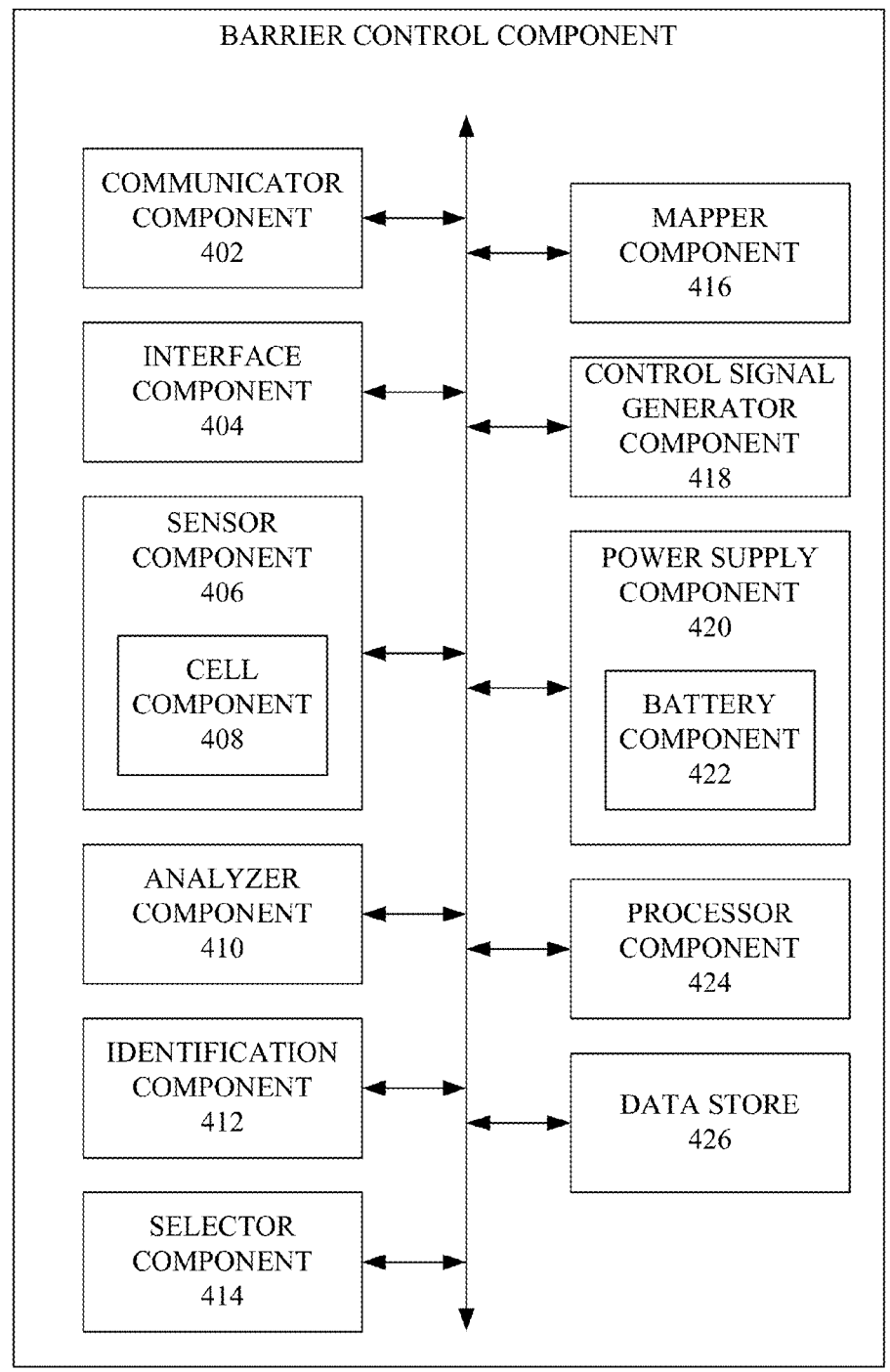
FIG. 4 depicts a block diagram of an example barrier control component in accordance with various aspects and embodiments of the disclosed subject matter.

FIG. 4 illustrates a block diagram of an example barrier control component 400 in accordance with various aspects and embodiments of the disclosed subject matter. In an aspect, the barrier control component 400 can include a communicator component 402 that can facilitate communication (e.g., transmission, reception) of information between components within the barrier control component 400 or communication between the barrier control component 400 and other components (e.g., barrier component, display screen component) associated with the barrier control component 400. The communicator component 402 can communicate data via a wireline or wireless communication connection using one or more specified communication protocols and one or more types of communication technology (e.g., wireless communication technology, such as Bluetooth, cellular, Near Field Communication (NFC), etc.), for example, as are known in the art.

To facilitate wireless communication of data, the communicator component 402 can comprise, for example, one or more antennas that can receive a signal(s) from and/or transmit a signal(s) to a wireless device (e.g., barrier component), wireless ports and routers, and so forth, that operate in a communication network (e.g., radio access network). It should be appreciated that one or more antennas can be part of communication platform, which can comprise electronic components and associated circuitry that provide for processing and manipulation of received signal(s) and signal(s) to be transmitted, e.g., receivers and transmitters, multiplexer/demultiplexer (mux/demux) component, and modulation/demodulation (mod/demod) component.

The barrier control component 400 can comprise an interface component 404 that can comprise one or more interfaces (e.g., display screens, touch screens, buttons, controls, mouse, rollerball, trackpad, voice activation, switches, adapters, connectors, speakers, etc.) that can be utilized to facilitate connection and communication with other components (e.g., barrier component) and presentation of information to a user, for example, to enable a user to update the barrier control component 400 to modify control signals, mapping information, etc. (e.g., if additional barrier patterns are added to an associated barrier component).

The barrier control component 400 can contain a sensor component 406 that can comprise one or more sensors (e.g., light-sensing sensors), for example, in the form of a sensor array, wherein the one or more sensors can sense or detect information, such as optical signals (e.g., light signals) transmitted or emitted from a control region of a display screen component. In some implementations, the sensor component 406 can comprise a cell component 408 that can include one or more solar cells (e.g., photovoltaic cells) that can receive or detect light, including optical signals, from visual images presented in a control region of a projector screen component associated with the barrier control component 400. The one or more solar cells of the cell component 408 can convert detected light energy into electrical energy, for example, through a photovoltaic effect process, or indirectly by first converting the light energy into heat energy and converting the heat energy to electrical energy. The cell component 408 can include other electronic circuitry that can be used to transfer power generated by the cell component 408 to other components, such as, for example, other components of the barrier control component 400, an associated barrier component, and/or the projector screen component.

The barrier control component 400 also can include an analyzer component 410 that can analyze information, such as optical signals obtained from the display screen component, mapping information, or other information, to facilitate identifying a control signal that corresponds to a detected optical signal, wherein the control signal can be sent to the associated barrier component to control switching of the barrier component.

The barrier control component 400 can comprise an identification component 412 that can operate in conjunction with the analyzer component 410 to identify a control signal based at least in part on the detected optical signal. In still another aspect, the barrier control component 400 can include a selector component 414 that can select items, such as the identified control signal, for example.

The barrier control component 400 also can contain a mapper component 416 that can generate and/or contain a mapping of respective optical signals (or other received signals, such as audio signals) to respective control signals. The mapper component 416 also can generate and/or contain a mapping of the respective optical signals and respective control signals to other items, such as respective barrier patterns, respective barrier pattern modes, respective display modes, etc.

The barrier control component 400 can include a control signal generator component 418 that can generate or produce different types of control signals, wherein a control signal of a plurality of available control signals can be generated and transmitted to the barrier component to facilitate switching of the barrier component between display modes, as more fully disclosed herein.

In some implementations, the barrier control component 400 can comprise a power supply component 420 that can employ an internal power supply to power the barrier control component 400 or can receive power from an external power supply to power the barrier control component 400. The power supply component 420 can comprise a battery component 422 that can include one or more batteries (e.g., rechargeable or replaceable batteries). The power supply component 420 can provide power to various components of the barrier control component 400, barrier component, and/or projector screen component. The power supply component 420 can be electrically and/or communicatively connected to the sensor component 406, and can receive power generated by the cell component 408, and can store that power in the battery component 422.

The barrier control component 400 also can comprise a processor component 424 that can work in conjunction with the other components (e.g., communicator component 402, interface component 404, sensor component 406, etc.) to facilitate performing the various functions of the barrier control component 400. The processor component 424 can employ one or more processors, microprocessors, or controllers that can process data, such as detected signals (e.g., optical signals or patterns) relating to visual images being presented by the projector screen component, mapping information relating the detected signals and control signals, data relating to parameters associated with the barrier control component 400 and associated components, etc., to facilitate identifying a desired control signal to transmit to the barrier component in response to a detected signal. The processor component 424 also can control data flow between the barrier control component 400 and other components associated with the barrier control component 400.

The barrier control component 400 can contain a data store 426 that can store data structures (e.g., user data, metadata); code structure(s) (e.g., modules, objects, classes, procedures), commands, or instructions; data, such as detected signals (e.g., optical signals or patterns) relating to visual images being presented by a projector screen component; control signal information; information relating to barrier patterns; analysis data; mapping information relating the detected signals and control signals; data relating to parameters associated with the barrier control component 400 and associated components; etc. In an aspect, the processor component 424 can be functionally coupled (e.g., through a memory bus) to the data store 426 in order to store and retrieve information desired to operate and/or confer functionality, at least in part, to the communicator component 402, interface component 404, sensor component 406, etc., and/or substantially any other operational aspects of the barrier control component 400. It is to be appreciated and understood that the various components of the barrier control component 400 can communicate information between each other (e.g., via a bus) and/or between other components associated with the barrier control component 400 as desired to carry out operations of the barrier control component 400. It is to be further appreciated and understood that the communicator component 402, interface component 404, sensor component 406, etc., of the barrier control component 400 can each be included within the barrier control component 400 (as depicted), can be a stand-alone unit, or can be incorporated within another component, and/or virtually any suitable combination thereof, as desired.

Figure 5:
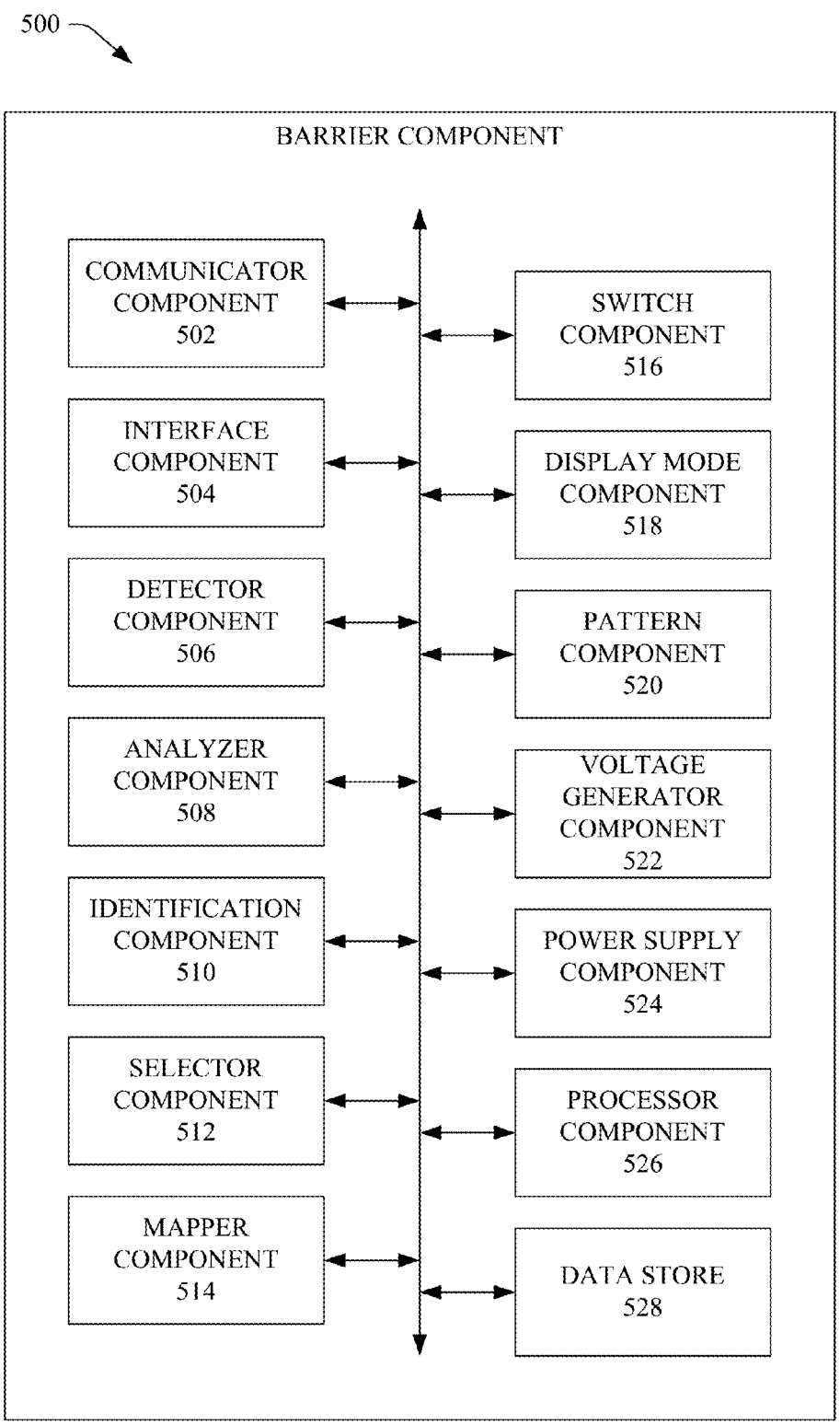
FIG. 5 illustrates a block diagram of an example barrier component in accordance with various aspects and embodiments of the disclosed subject matter.

FIG. 5 illustrates a block diagram of an example barrier component 500 in accordance with various aspects and embodiments of the disclosed subject matter. In an aspect, the barrier component 500 can include a communicator component 502 that can facilitate communication (e.g., transmission, reception) of information between components within the barrier component 500 or communication between the barrier component 500 and other components (e.g., barrier control component, projector screen component) associated with the barrier component 500. The communicator component 502 can communicate data via a wireline or wireless communication connection using one or more specified communication protocols and one or more types of communication technology (e.g., wireless communication technology, such as Bluetooth, cellular, Near Field Communication (NFC), etc.), for example, as are known in the art. To facilitate wireless communication of data, the communicator component 502 can comprise, for example, one or more antennas that can receive a signal(s) from and/or transmit a signal(s) to a wireless device (e.g., barrier control component), wireless ports and routers, and so forth, that operate in a communication network (e.g., radio access network). It should be appreciated that one or more antennas can be part of communication platform, which can comprise electronic components and associated circuitry that provide for processing and manipulation of received signal(s) and signal(s) to be transmitted, e.g., receivers and transmitters, multiplexer/demultiplexer (mux/demux) component, and modulation/demodulation (mod/demod) component.

The barrier component 500 can comprise an interface component 504 that can comprise one or more interfaces (e.g., presentation or display screen, touch screens, buttons, controls, mouse, rollerball, trackpad, voice activation, switches, adapters, connectors, speakers, etc.) that can be utilized to facilitate connection and communication with other components (e.g., barrier control component) and presentation of information to a user, for example, to enable a user to update the barrier component 500 to modify (e.g., change, add, remove, etc.) barrier patterns, barrier pattern modes, mapping information, etc. (e.g., if additional barrier patterns are added to the barrier component 500).

In another aspect, the barrier component 500 can contain a detector component 506 that can monitor received information (e.g., information provided by the barrier control component) and can detect a control signal received from the associated barrier control component, wherein the detected control signal can be forwarded to an analyzer component 508 for further processing.

In yet another aspect, the barrier component 500 can employ the analyzer component 508 to analyze information, such as the control signal received from the barrier control component, mapping information, or other information, to facilitate identifying a specified display mode, specified barrier pattern and/or specified barrier pattern mode that can correspond to the detected control signal, wherein the specified barrier pattern and specified barrier pattern mode can be utilized to process video content being presented by the projector screen component (e.g., as received from the projector component).

In another aspect, the barrier component 500 can comprise an identification component 510 that can operate in conjunction with the analyzer component 508 to identify a specified display mode, specified barrier pattern and/or specified barrier pattern mode based at least in part on the detected control signal. In still another aspect, the barrier component 500 can include a selector component 512 that can select items, such as the identified specified display mode, specified barrier pattern and/or specified barrier pattern mode, for example. In yet another aspect, the barrier component 500 can contain a mapper component 514 that can generate and/or contain a mapping of respective control signals to other items, such as respective barrier patterns, respective barrier pattern modes, respective display modes, etc., which can be utilized to facilitate identifying a desired display mode, barrier pattern and/or barrier pattern mode for use in processing and presenting video content, as more fully disclosed herein.

In an aspect, the barrier component 500 can include a switch component 516 that can control switching (e.g., automatically or dynamically in real time) of barrier patterns and barrier pattern modes, and/or corresponding display modes, in accordance with (e.g., in response to) the detected control signal and video content being presented by the projector screen component. The barrier component 500 can further comprise a display mode component 518 that can comprise a plurality of available display modes (e.g., normal 2-D display mode, 3-D stereoscopic display mode, 3-D autostereoscopic display mode) that can correspond to respective barrier patterns and barrier pattern modes that can be employed by the barrier component 500, as more fully disclosed herein.

In still another aspect, the barrier component 500 can contain a pattern component 520 that can comprise a plurality of barrier patterns for use in processing video content for display. One or more of the barrier patterns can comprise multiple modes, such as, for example, a transparent mode and a partially opaque mode, wherein the transparent mode can be selected when normal 2-D content is being processed and the partially opaque mode (e.g., partially opaque in the form of a repetitive pattern of columns of evenly spaced opaque vertical strips for use to process stereoscopic-type 3-D content; partially opaque in the form of a plurality of slanted opaque strips, which can be repetitive and/or regularly spaced, for use to process autostereoscopic-type 3-D content) can be selected when enhanced 2-D content is being processed to reconstruct a 3-D scene, as more fully disclosed herein.

In yet another aspect, the barrier component 500 can include a voltage generator component 522 that can be used by the switch component 516 to generate and apply a specified voltage to electrodes associated with a barrier pattern to select a desired barrier pattern mode, wherein respective applied voltages can facilitate selection of respective barrier pattern modes of a barrier pattern. Different voltages applied to electrodes can correspond to different barrier patterns.

In yet another aspect, the barrier component 500 can comprise a power supply component 524 that can employ an internal power supply to power the barrier component 500 or can receive power from an external power supply that can be used to power the barrier component 500. In some implementations, the power supply component 524 can receive power from the barrier control component, wherein the barrier control component can produce power using one or more solar cells that can generate power based at least in part on the light from detected optical signals associated with visual images and presented in the control region of the projector screen component.

The barrier component 500 also can comprise a processor component 526 that can work in conjunction with the other components (e.g., communicator component 502, interface component 504, detector component 506, etc.) to facilitate performing the various functions of the barrier component 500. The processor component 526 can employ one or more processors, microprocessors, or controllers that can process data, including control signals relating to video content being presented by an associated projector screen component, video content, audio content, mapping information relating the control signals, type of video content and/or types/modes of barrier patterns, data relating to parameters associated with the barrier component 500 and associated components, etc., to facilitate identifying a desired display mode, barrier pattern and/or barrier pattern mode to employ in relation to processing video content received from the projector screen component. The processor component 526 also can control data flow between the barrier component 500 and other components associated with the barrier component 500.

In yet another aspect, the barrier component 500 can contain a data store 528 that can store data structures (e.g., user data, metadata); code structure(s) (e.g., modules, objects, classes, procedures), commands, or instructions; data, including control signals relating to visual images being presented by the associated projector screen component, video content, audio content, signal information, barrier pattern related information, analysis data, mapping information relating the signals and type of video content, data relating to parameters associated with the barrier component 500 and associated components; etc. In an aspect, the processor component 526 can be functionally coupled (e.g., through a memory bus) to the data store 528 in order to store and retrieve information desired to operate and/or confer functionality, at least in part, to the communicator component 502, interface component 504, detector component 506, etc., and/or substantially any other operational aspects of the barrier component 500. It is to be appreciated and understood that the various components of the barrier component 500 can communicate information between each other and/or between other components associated with the barrier component 500 as desired to carry out operations of the barrier component 500. It is to be further appreciated and understood that the communicator component 502, interface component 504, detector component 506, etc., of the barrier component 500, can each be included within the barrier component 500 (as depicted), can be a stand-alone unit, or can be incorporated within another component, and/or virtually any suitable combination thereof, as desired.

Figure 6:
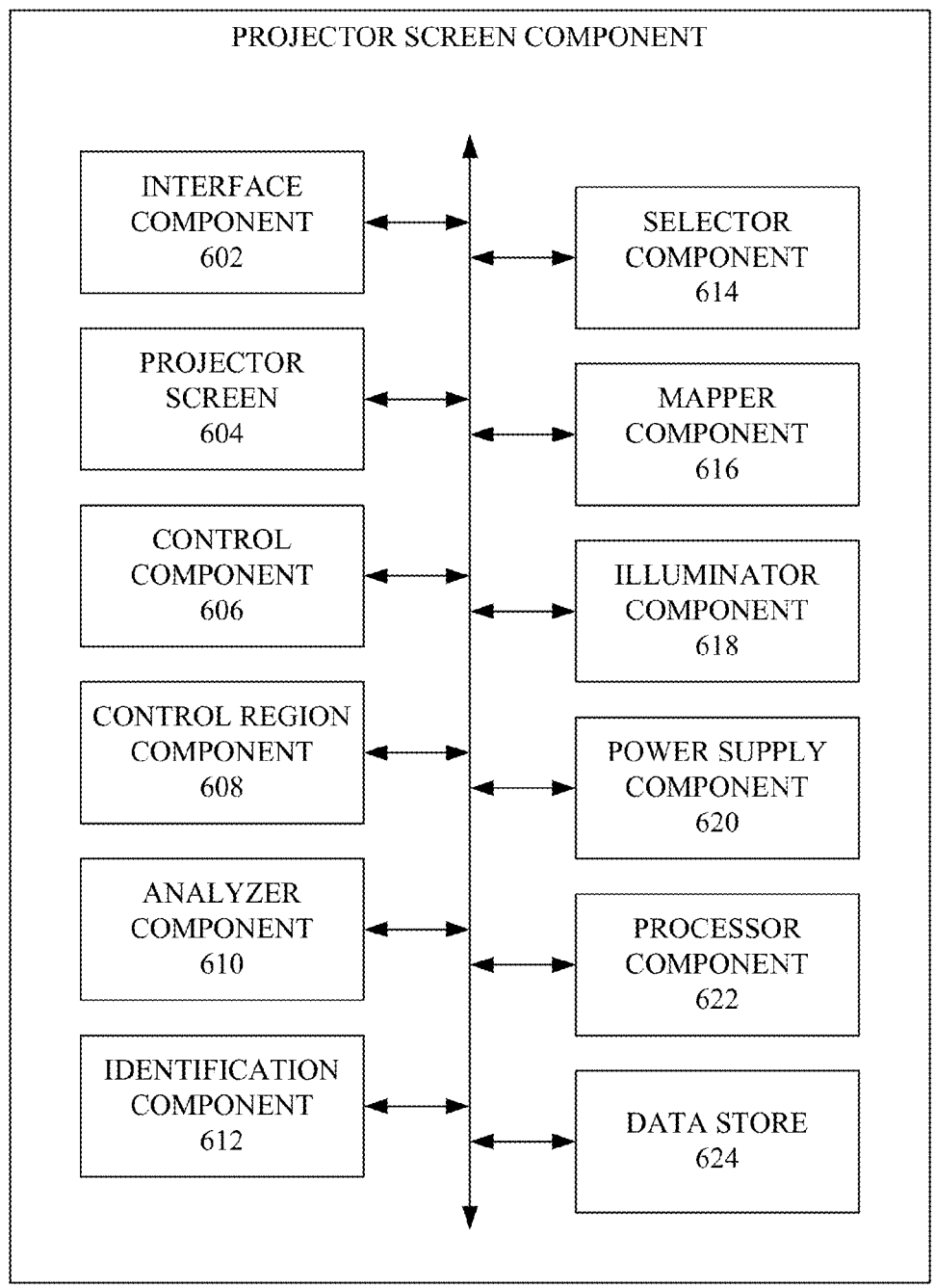
FIG. 6 presents a block diagram of an example projector screen component in accordance with various aspects and embodiments of the disclosed subject matter.

FIG. 6 presents a block diagram of an example projector screen component 600 in accordance with various aspects and embodiments of the disclosed subject matter. It is to be appreciated and understood that, in some embodiments, the projector screen component 600 can include a mechanical component (e.g., projector screen comprising mechanical components), and in other embodiments, the projector screen component 600 can comprise mechanical components, electronic components, and/or computer-related components. The projector screen component 600 can include all or a desired portion of the various components described herein in relation to FIG. 6 and the projector screen component 600.

In an aspect, the projector screen component 600 can comprise an interface component 602 that can present visual images and audio information to a user. The interface component 602 can provide one or more output interfaces (e.g., in various implementations, a projector screen 604, a display or control region on a projector screen, speakers, etc.) that can present (e.g., display) information to the user. The interface component 602 also can include input and other types of interfaces (e.g., touch screens, buttons, controls, mouse, rollerball, trackpad, voice activation, switches, adapters, connectors, etc.) to facilitate receiving information from a user as well as to enable communication and electrical connectivity by the projector screen component 600 with other components. For instance, in accordance with various embodiments, the interface component 602 can display one or more parameter controls, one or more menus, a keyboard (e.g., on a touch screen display), etc., to facilitate enabling the user to adjust the presentation of video and audio content to the user.

In some embodiments, the projector screen 604 can be or can comprise a projector or display screen, such as a rear projection screen, that can be structured to receive visual images from a projector component (e.g., placed behind the projector screen component 600 in relation to a viewer(s) positioned in front of the projector screen component 600) and present the visual images to a viewer(s). The projector screen 604 can be constructed of a flexible material(s) (e.g., fabric, plastic film, etc.), semi-rigid material(s), or rigid material(s). The projector screen 604 also can have a suitable coating (e.g., optical coating, diffusion coating, neutral coating, etc.) that can facilitate the presentation or reproduction of visual images by the projector screen 604. In other embodiments, the projector screen 604 can comprise a LCD, LED display, a combination LCD-LED display, a plasma display (e.g., plasma display panel (PDP)), a DLP display, a CRT display, or other type of projection or display screen that can present (e.g., display) visual images.

The projector screen component 600 can include a control component 606 that can control the presentation of video and audio content, and further can control the presentation (e.g., transmission, emission) of a signal, such as an optical signal, to an associated barrier control component. At a given time when video content is being presented by the projector screen component 600, the signal can be one of a plurality of available signals, wherein the signal can comprise information (e.g., specified optical pattern, bits of data having a specified data value) that can indicate, to the barrier control component, the type of video content, the desired type of barrier pattern and barrier pattern mode to be used in processing the video content for presentation to the viewer, and/or the desired control signal the barrier control component is to send to the barrier component.

In some embodiments, the control component 606 can operate in conjunction with a control region component 608 to present the signal to the barrier control component. The control region component 608 can include a control region and/or can be employed to create a control region in or on the projector screen 604 for presentation of the signal in relation to presentation of visual images being presented by the projector screen 604, wherein the control region can have a specified size and shape, as desired. The control region component 608 can present the signal associated with a visual image(s) in the control region to facilitate presentation of the signal to the barrier control component when video content is being presented by the projector screen component 600.

The projector screen component 600 can include an analyzer component 610 that can analyze information, such as video content, information (e.g., metadata) relating to the video content, mapping information relating to the optical signals and types/modes of barrier patterns, or other information, to facilitate identifying a signal associated with a visual image(s) to present in the control region in relation to video content being presented. The signal can be presented to the barrier control component via the control region to facilitate controlling switching of the barrier component.

The projector screen component 600 also can comprise an identification component 612 that can identify a signal associated with a visual image(s) based at least in part on the type of video content being presented. In still another aspect, the projector screen component 600 can include a selector component 614 that can select items, such as the identified signal as well as items selected by a user via the interface component 602. In yet another aspect, the projector screen component 600 can contain a mapper component 616 that can generate and/or contain a mapping of respective types of optical signals (or other signals, such as audio signals) to respective types of video content, respective types or modes of barrier patterns, respective display modes, and/or respective types of control signals.

The projector screen component 600 can include an illuminator component 618 that can illuminate pixels associated with the projector screen 604 at respective wavelengths and illumination levels to facilitate producing and presenting the video content as well as the signal in the control region. In accordance with various embodiments, the illuminator component 618 can be a mechanical component, an electronic component, and/or a combination thereof.

The projector screen component 600 can contain a power supply component 620 that can employ an internal power supply to power the projector screen component 600 or can receive power from an external power supply to power the projector screen component 600. In some implementations, the power supply component 620 can receive power from the barrier control component, wherein the barrier control component can produce power using one or more solar cells that can generate power based at least in part on the light from detected optical signals associated with visual images and presented in the control region of the projector screen component.

The projector screen component 600 also can comprise a processor component 622 that can work in conjunction with the other components (e.g., interface component 602, projector screen 604, control component 606, etc.) to facilitate performing the various functions of the projector screen component 600. The processor component 622 can employ one or more processors, microprocessors, or controllers that can process data, such as signals (e.g., optical signals or patterns) relating to video content being presented by a projector screen component 600, video content, audio content, mapping information relating the optical signals, type of video content and/or types/modes of barrier patterns, data relating to parameters associated with the projector screen component 600 and associated components, etc., to facilitate presenting or identifying a desired signal to transmit to the barrier control component in associated with video content being presented. The processor component 622 can control data flow between the projector screen component 600 and other components associated with the projector screen component 600.

In yet another aspect, the projector screen component 600 can contain a data store 624 that can store data structures (e.g., user data, metadata); code structure(s) (e.g., modules, objects, classes, procedures), commands, or instructions; data, such as signals (e.g., optical signals or patterns) relating to video content being presented by a projector screen component 600; signal information; barrier pattern related information; analysis data; mapping information relating the signals and type of video content; data relating to parameters associated with the projector screen component 600 and associated components; etc. In an aspect, the processor component 622 can be functionally coupled (e.g., through a memory bus) to the data store 624 in order to store and retrieve information desired to operate and/or confer functionality, at least in part, to the interface component 602, projector screen 604, control component 606, etc., and/or substantially any other operational aspects of the projector screen component 600. It is to be appreciated and understood that the various components of the projector screen component 600 can communicate information between each other and/or between other components associated with the projector screen component 600 as desired to carry out operations of the projector screen component 600. It is to be further appreciated and understood that the interface component 602, projector screen 604, control component 606, etc., of the projector screen component 600 can each be included within the projector screen component 600 (as depicted), can be a stand-alone unit, or can be incorporated within another component, and/or virtually any suitable combination thereof, as desired.

Figure 7:
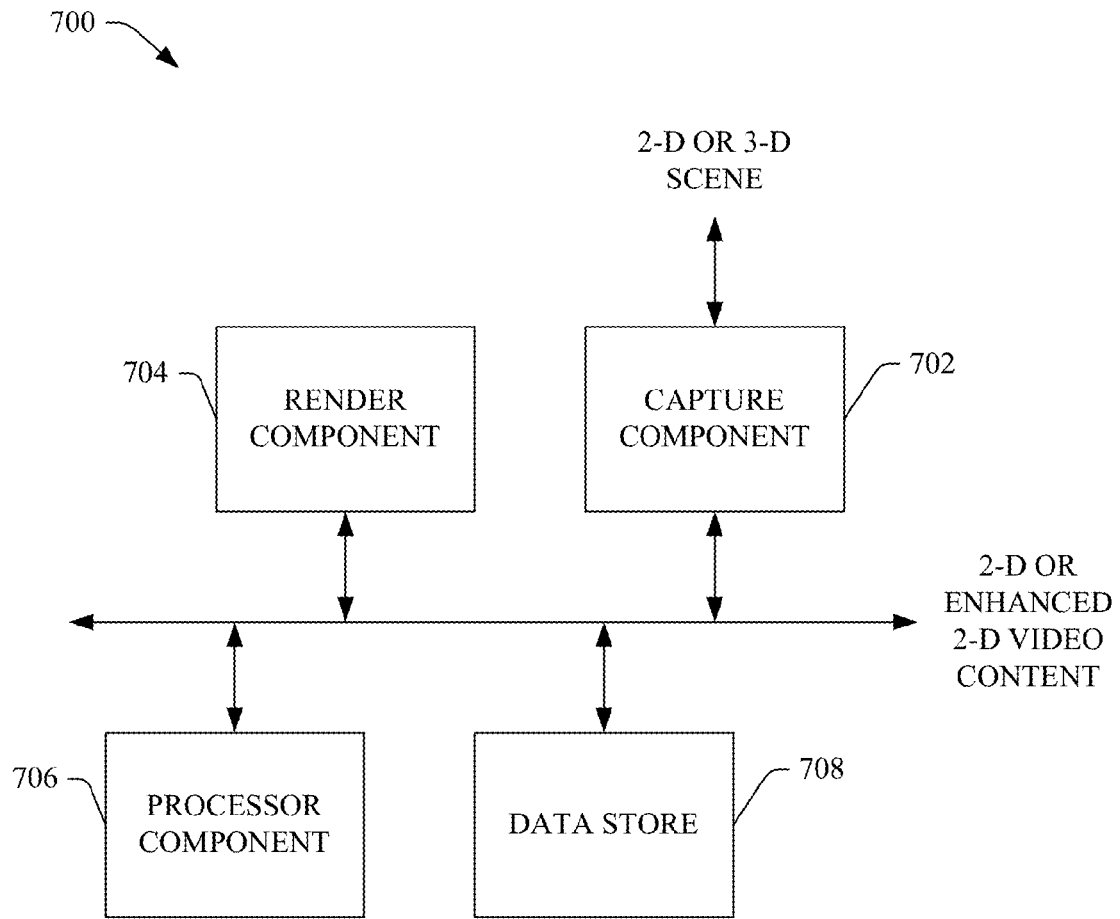
FIG. 7 illustrates a diagram of an example system that can capture and process a real scene as a 3-dimensional (3-D) scene in accordance with various aspects and embodiments of the disclosed subject matter.
Figure 8:
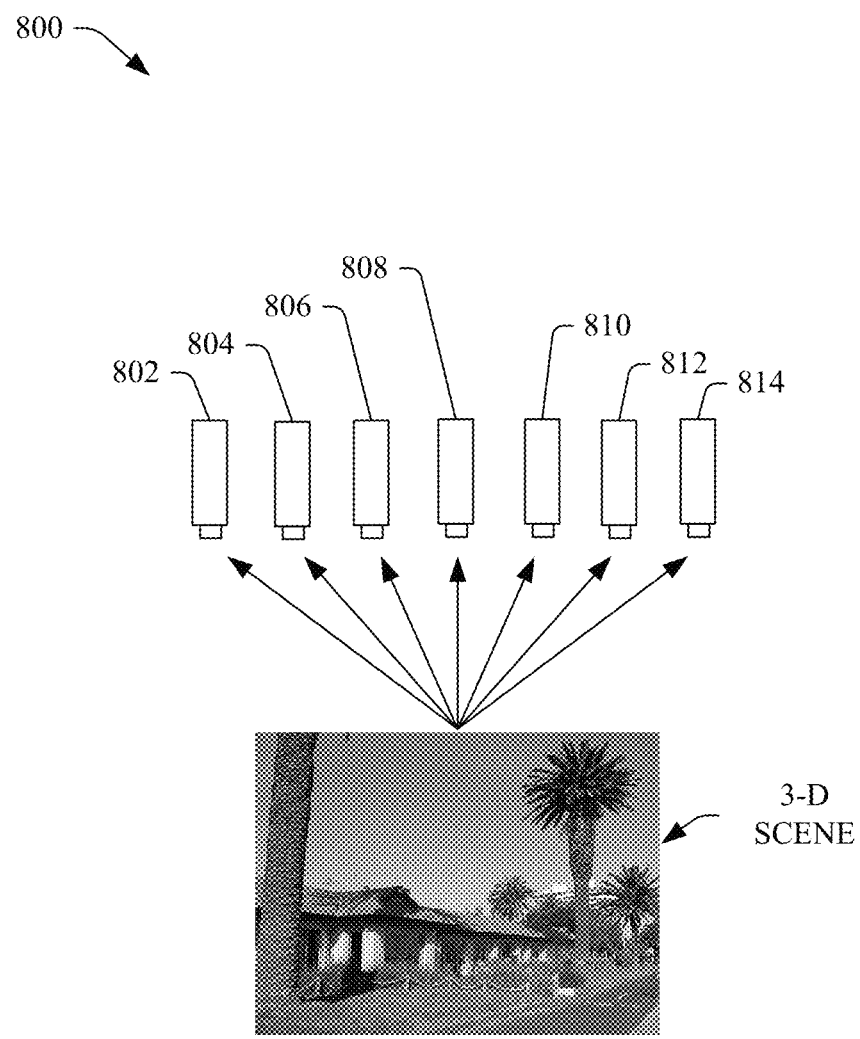
FIG. 8 presents an example system for capturing a real 3-D scene, in accordance with various aspects and embodiments of the disclosed subject matter.

FIG. 7 illustrates a diagram of an example system 700 that can capture and process a real scene as a 3-D scene in accordance with various aspects and embodiments of the disclosed subject matter. The system 700 can include a capture component 702 that can capture or generate (e.g., computer generate or simulate) multiple 2-D views of a real or synthetic 3-D scene image for each image of a 3-D scene. Turning briefly to FIG. 8 (along with FIG. 7), which depicts an example system 800 for capturing a real 3-D scene, the system 800 can comprise a plurality of scene capture devices (e.g., video cameras), such as scene capture devices 802, 804, 806, 808, 810, 812, and 814. The respective scene capture devices 802 through 814 can be placed in different positions in relation to the real 3-D scene to provide different visual perspectives of the 3-D scene from different angles. The various different positions of the respective scene capture devices 802 through 814 can correspond to the barrier pattern mode (e.g., associated with an autostereoscopic barrier pattern) to be employed when reconstructing and presenting the 3-D scene to the viewer, wherein a corresponding barrier pattern can be structured (e.g., partially opaque and having a defined pattern, as more fully disclosed herein) so that it can receive enhanced video information relating to an image of the 3-D scene (e.g., enhanced 2-D content of an image of the 3-D scene) based at least in part on the respective subsets of visual information associated with the real 3-D scene, can process the enhanced video information to identify the respective 2-D images captured by the respective scene capture devices 802 through 814, and can direct the respective 2-D images to proceed in respective directions that correspond to the respective positions of the respective scene capture devices 802 through 814 when the respective scene capture devices 802 through 814 were capturing the real 3-D scene from their respective perspectives, as more fully disclosed herein, so that the reconstructed real 3-D scene can be the same or substantially similar to the real 3-D scene as captured, when the reconstructed real 3-D scene is presented by the barrier component to the viewer.

In another aspect, the capture component 702 can be employed to generate or synthesize a 3-D scene, wherein the capture component 702 can generate respective subsets of visual information from a plurality of respective positions in relation to the 3-D scene being synthesized to provide different perspectives of the 3-D scene. The various different positions, associated with the respective subsets of visual information relating to the synthesized 3-D scene, can correspond to the barrier pattern mode (e.g., associated with an autostereoscopic barrier pattern) to be employed when reconstructing and presenting the synthesized 3-D scene to the viewer, wherein the corresponding barrier pattern can be structured so that it can receive enhanced video information relating to an image of the 3-D scene (e.g., enhanced 2-D content of an image of the 3-D scene) based at least in part on the respective subsets of visual information for the synthesized 3-D scene, can process the enhanced video information to identify the respective 2-D images of the respective subsets of visual information, and can direct the respective 2-D images to proceed in respective directions that can correspond to the respective positions associated with the respective subsets of visual information for the respective perspectives of the synthesized 3-D scene, so that the reconstructed synthesized 3-D scene can be the same or substantially similar to the synthesized 3-D scene as generated, when the reconstructed synthesized 3-D scene is presented by the barrier component to the viewer.

In an aspect, the respective scene capture devices 802 through 814 can collect or capture respective subsets of visual information relating to the real 3-D scene to facilitate recreating the real 3-D scene later for a viewer. The scene capture devices 802 through 814 can be associated (e.g., communicatively connected via a wired or wireless communication connection) with the capture component 702 of FIG. 7, and the capture component 702 can receive the respective subsets of video information relating to the real 3-D scene from the respective scene capture devices 802 through 814.

In another aspect, the system 700 can include a render component 704 that can receive the respective subsets of visual information of a 3-D scene (e.g., real or synthesized) and can render or generate enhanced 2-D video content, based at least in part on the respective subsets of visual information. For each 2-D image of the enhanced 2-D video content, such 2-D image can comprise visual information for all of the different positions or perspectives of the 3-D scene, wherein the barrier component, employing the appropriate barrier pattern in accordance with the appropriate barrier pattern mode, can use the visual information to reconstruct all of the 2-D images from the various different visual perspectives to reconstruct the 3-D image based at least in part on the various reconstructed 2-D images of the different visual perspectives. The enhanced 2-D video content and/or the captured or generated visual information can be stored in the data store 708.

The system 700 also can comprise a processor component 706 that can work in conjunction with the other components (e.g., capture component 702, render component 704, etc.) to facilitate performing the various functions of the system 700. The processor component 706 can employ one or more processors, microprocessors, or controllers that can process data, such as information (e.g., visual information) relating to a real or synthesized 3-D scene, data relating to parameters associated with the system 700 and associated components, etc., to facilitate capturing, generating, synthesizing, and rendering visual information relating to or representative of a 3-D scene; and can control data flow between the system 700 and other components associated with the system 700 and data flow between the various components of the system 700.

In yet another aspect, the system 700 can contain a data store 708 that can store data structures (e.g., user data, metadata); code structure(s) (e.g., modules, objects, classes, procedures), commands, or instructions; information, such as visual information, relating to (e.g., representative of) a 3-D scene; render data; and so on. In an aspect, the processor component 706 can be functionally coupled (e.g., through a memory bus) to the data store 708 in order to store and retrieve information desired to operate and/or confer functionality, at least in part, to the capture component 702, render component 704, and/or substantially any other operational aspects of the system 700. It is to be appreciated and understood that the various components of the system 700 can communicate information between each other and/or between other components associated with the system 700 as desired to carry out operations of the system 700. It is to be further appreciated and understood that the capture component 702, render component 704, processor component 706, and data store 708 each can be a stand-alone unit, can be included within the system 700 (as depicted), can be incorporated within another component, and/or virtually any suitable combination thereof, as desired.

In accordance with another embodiment of the disclosed subject matter, one or more components (e.g., barrier control component, projector screen component, barrier component, etc.) can utilize artificial intelligence (AI) techniques or methods to infer (e.g., reason and draw a conclusion based at least in part on a set of metrics, arguments, or known outcomes in controlled scenarios) an automated response to perform in response to an inference(s); type of video content being presented; a barrier pattern and/or barrier pattern mode to use for processing video content; etc. Artificial intelligence techniques typically can apply advanced mathematical algorithms—e.g., decision trees, neural networks, regression analysis, principal component analysis (PCA) for feature and pattern extraction, cluster analysis, genetic algorithm, and reinforced learning—to historic and/or current data associated with the systems and methods disclosed herein to facilitate rendering an inference(s) related to the systems and methods disclosed herein.

In particular, the one or more components in the communication network environment can employ one of numerous methods for learning from data and then drawing inferences from the models so constructed, e.g., Hidden Markov Models (HMMs) and related prototypical dependency models. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies also can be employed. Moreover, game theoretic models (e.g., game trees, game matrices, pure and mixed strategies, utility algorithms, Nash equilibria, evolutionary game theory, etc.) and other approaches that perform data fusion, etc., can be exploited in accordance with implementing various automated aspects described herein. The foregoing techniques or methods can be applied to analysis of the historic and/or current data associated with systems and methods disclosed herein to facilitate making inferences or determinations related to systems and methods disclosed herein.

In accordance with one embodiment of the disclosed subject matter, one or more of the systems, the devices, the barrier control component, and/or other components disclosed herein, can be or can comprise one or more electronic circuits situated or implemented on a single integrated-circuit chip. In accordance with another embodiment, one or more of the systems, the devices, the barrier control component, and/or other components disclosed herein, can be or can comprise one or more electronic circuits implemented on an application-specific integrated-circuit (ASIC) chip. In yet another embodiment, one or more of the systems, the devices, the barrier control component, and/or other components disclosed herein, can be or can comprise one or more electronic circuits situated or implemented on multiple dies or chips.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 9-13 illustrate methods and/or flow diagrams in accordance with the disclosed subject matter. For simplicity of explanation, the methods are depicted and described as a series of acts. It is to be understood and appreciated that the subject disclosure is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device, carrier, or media.

Figure 9:
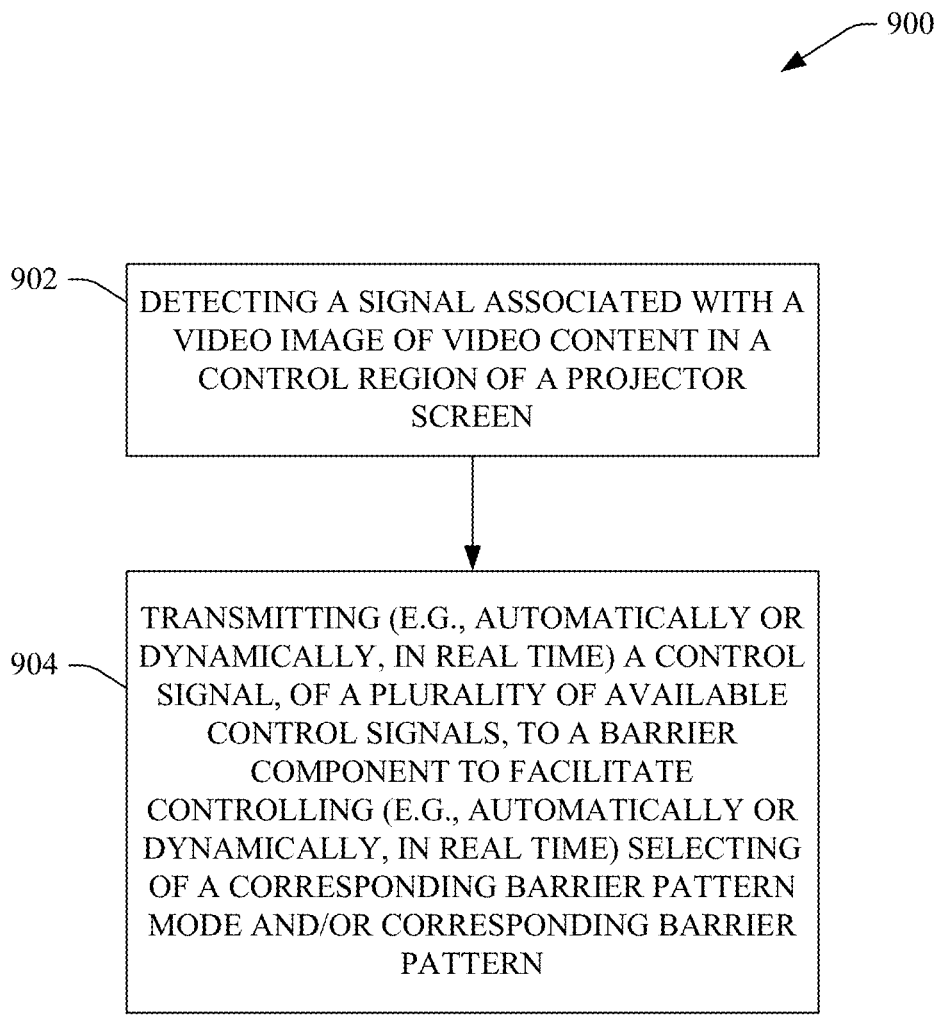
FIG. 9 depicts a flow diagram of an example method that can control (e.g., automatically or dynamically, in real time) switching or selecting of a particular display mode of a plurality of available display modes of a barrier component in accordance with various embodiments and aspects of the disclosed subject matter is illustrated.

Referring to FIG. 9, a flow diagram of an example method 900 that can control (e.g., automatically or dynamically, in real time) switching or selecting of a particular display mode of a plurality of available display modes of a barrier component in accordance with various embodiments and aspects of the disclosed subject matter is illustrated. The method 900 can be implemented by a barrier control component to facilitate controlling switching or selecting of a particular display mode of a plurality of available display modes of a barrier component in relation to presentation of different types of video content on a projector screen component.

At 902, a signal associated with a video image of video content can be detected in a control region of a projector screen. For example, the barrier control component can monitor or scan the control region of a projector screen of a projector screen component during presentation of the video image (e.g., normal 2-D video image or enhanced 2-D visual image) displayed on the projector screen, and can detect the signal (e.g., optical signal) in the control region, wherein the signal can be one of a plurality of available signals that can be respectively associated with corresponding display modes and/or corresponding barrier pattern modes or barrier patterns associated with the barrier component.

At 904, in response to detecting the signal in the control region, a control signal, of a plurality of available control signals, can be transmitted (e.g., automatically or dynamically, in real time) to a barrier component to facilitate controlling (e.g., automatically or dynamically, in real time) selecting of or switching to a corresponding barrier pattern mode (and/or corresponding barrier pattern) by the barrier component, wherein the control signal can be identified and transmitted based at least in part on the detected signal. The control signal can facilitate controlling selection of a corresponding barrier pattern mode and a corresponding barrier pattern, which are most suitable for processing the video image, from a plurality of available barrier pattern modes and a plurality of available barrier patterns. The respective control signals of the plurality of available control signals can be associated with corresponding display modes and/or corresponding barrier pattern mode (and/or corresponding barrier pattern) associated with the barrier component. The barrier control component can identify and select the control signal from the plurality of available control signals, based at least in part on the identity (e.g., data value) of the signal detected in the control region in relation to the visual image.

Figure 10:
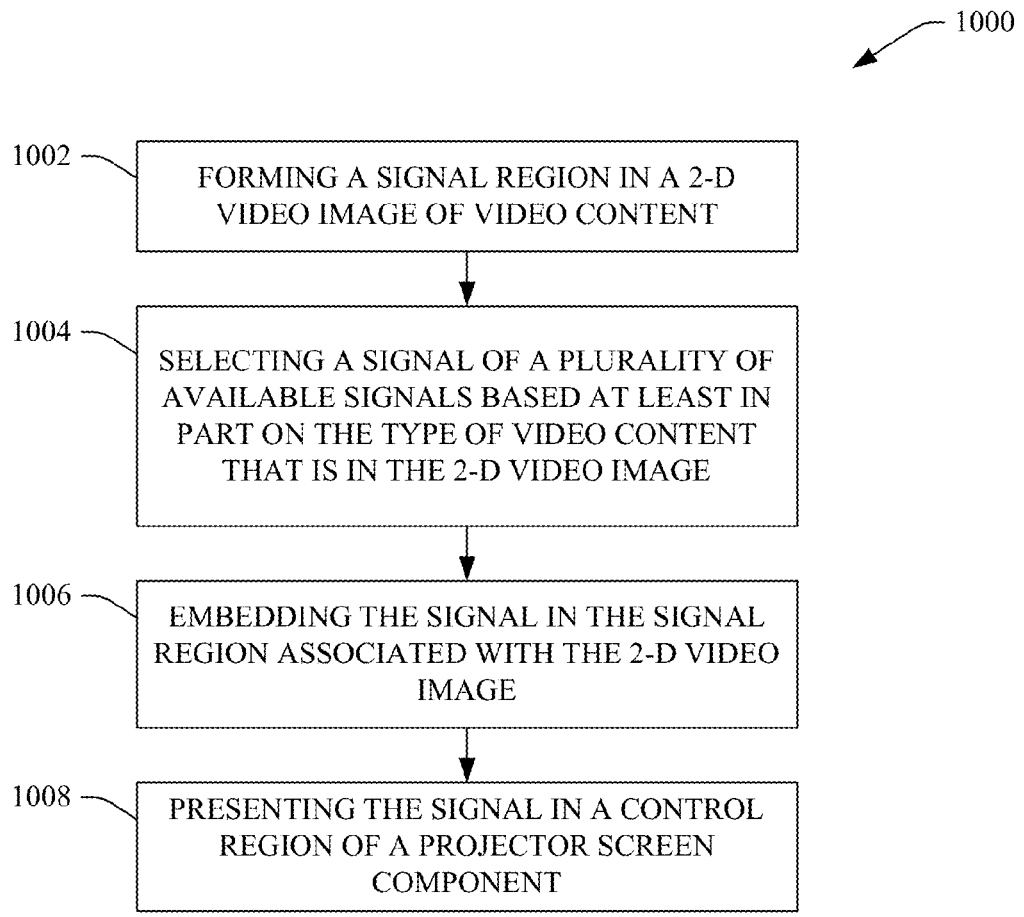
FIG. 10 illustrates a flow diagram of an example method for presenting a signal of a plurality of available signals (e.g., optical signals) in relation to a visual image to facilitate controlling (e.g., automatically or dynamically, in real time) switching or selecting of a particular display mode of a plurality of available display modes of a barrier component in accordance with various embodiments and aspects of the disclosed subject matter.

Turning to FIG. 10, illustrated is a flow diagram of an example method 1000 for presenting a signal of a plurality of available signals (e.g., optical signals) in relation to a visual image to facilitate controlling (e.g., automatically or dynamically, in real time) switching or selecting of a particular display mode of a plurality of available display modes of a barrier component in accordance with various embodiments and aspects of the disclosed subject matter. At 1002, a signal region can be formed in a 2-D video image of video content. The signal region can be sized (e.g., in terms of physical size, the number of pixels, and/or the number of data bits that can be contained within the control region) and shaped (e.g., square, circle, oval, rectangle, etc.) as desired so that it can contain information, such as a signal, therein, wherein the signal can correspond to the type of video content being presented.

At 1004, a signal of a plurality of available signals can be selected (or generated) based at least in part on the type of video content that is in the 2-D visual image. For example, a first signal can be selected when the 2-D visual image contains 2-D video content, a second signal can be selected when the 2-D visual image is enhanced and contains multiple images (e.g., two images) that form 3-D stereoscopic video content, or a third signal can be selected when the 2-D visual image is enhanced and contains multiple images (e.g., three or more images) that form 3-D autostereoscopic video content.

At 1006, the signal can be embedded in the signal region of the 2-D visual image. At 1008, the signal can be presented in a control region of a projector screen component. In an aspect, the projector component can present (e.g., emit, transmit, provide, etc.) the 2-D visual image and the signal embedded in the signal region. The projector screen component can receive and present the 2-D visual image on a projector screen, wherein the signal can be presented (e.g., displayed or projected) in the control region of the projector screen. The barrier control component can detect the presented signal in the control region. The barrier control component can use the signal to facilitate automatically generating a corresponding control signal and transmitting that control signal to the barrier component to facilitate controlling selecting or switching of a barrier pattern mode (and/or corresponding barrier pattern) in real time to desirably present (e.g., project, present) video content, as more fully disclosed herein.

Figure 11:
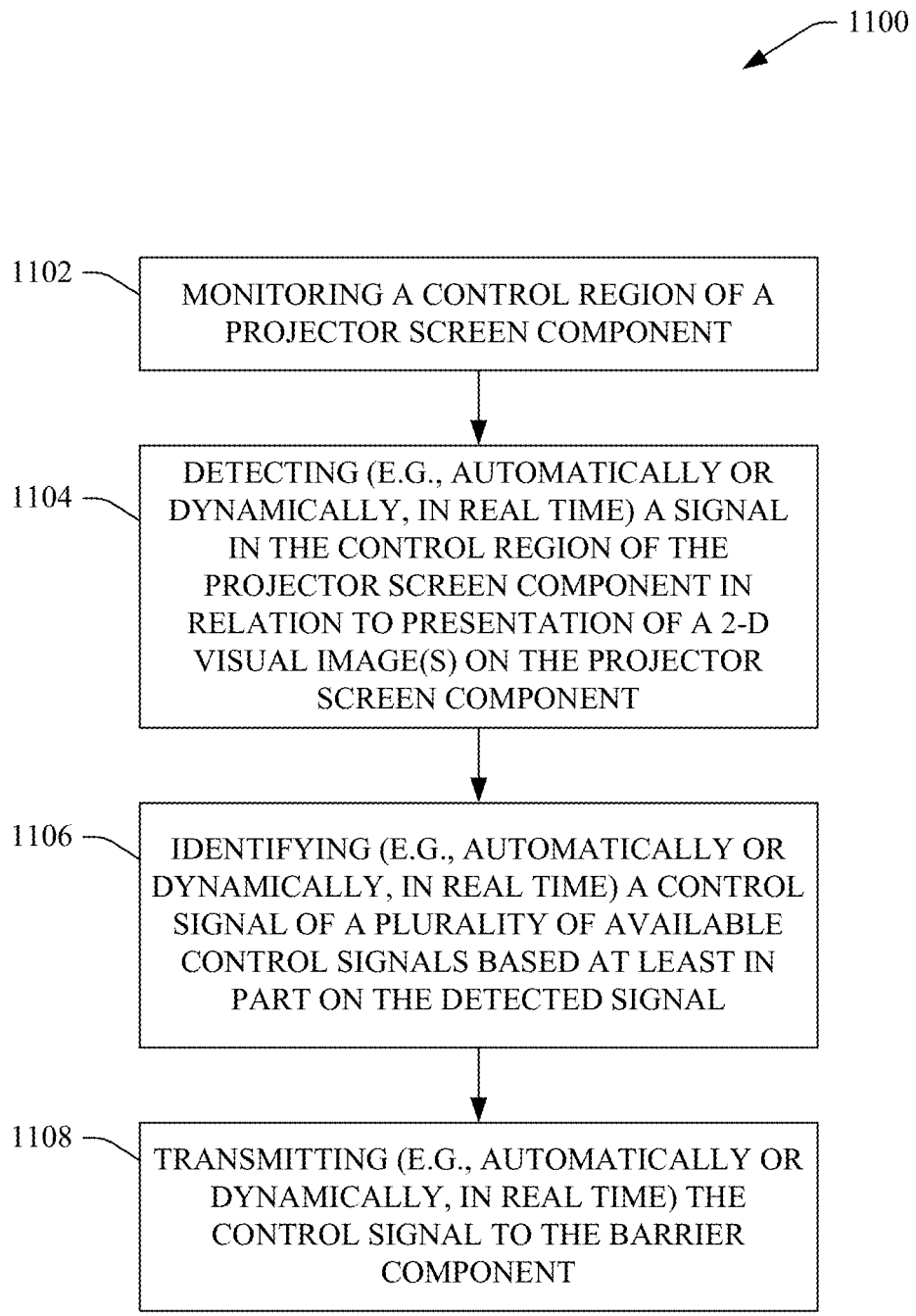
FIG. 11 depicts a flow diagram of an example method that can generate a control signal to facilitate controlling (e.g., automatically or dynamically, in real time) switching or selecting of a particular display mode of a plurality of available display modes of a barrier component in accordance with various embodiments and aspects of the disclosed subject matter.

FIG. 11 depicts a flow diagram of an example method 1100 that can generate a control signal to facilitate controlling (e.g., automatically or dynamically, in real time) switching or selecting of a particular display mode of a plurality of available display modes of a barrier component in accordance with various embodiments and aspects of the disclosed subject matter. The method 1100 can be implemented by a barrier control component to facilitate controlling switching or selecting of a particular display mode of a plurality of available display modes of a barrier component in relation to presentation of different types of video content on a projector screen component.

At 1102, a control region of a projector screen component can be monitored. The barrier control component can include a sensor component that can monitor the control region of the projector screen component to facilitate detecting signals (e.g., optical signals or patterns) presented in the control region in relation to presentation of the 2-D video image(s) on the projector screen component. The 2-D video image(s) can include a signal region, wherein a signal can be embedded in the 2-D video image(s) and can correspond to the type of video content (e.g., normal 2-D content, enhanced 2-D content that can be used to generate 3-D stereoscopic or autostereoscopic content) contained in the 2-D video image(s) to facilitate switching the barrier component to a barrier pattern that corresponds to the type of video content being projected.

At 1104, a signal can be detected (e.g., automatically or dynamically, in real time) in the control region of the projector screen component in relation to presentation of the 2-D visual image(s) on the projector screen component. The 2-D visual image(s) can be presented on the projector screen component. The signal embedded in the 2-D visual image(s) can be presented in the control region of the projector screen component. The sensor component can detect or sense the signal presented (e.g., emitted) in the control region of the projector screen component.

At 1106, a control signal of a plurality of available control signals can be identified (and selected) (e.g., automatically or dynamically, in real time) based at least in part on the detected signal. In an aspect, the barrier control component can identify and select the control signal, which can correspond (e.g., and be mapped) to the detected signal and also can correspond (e.g., and be mapped) to a specified barrier pattern mode (and/or specified barrier pattern) of a plurality of available barrier pattern modes (and/or available barrier patterns), wherein the barrier pattern mode (and/or barrier pattern) can be the desired (e.g., appropriate) barrier pattern mode (and/or barrier pattern) to use to process the 2-D video image for presentation to a viewer so that the quality of the image and visual characteristics (e.g., 3-D visual effects) can be reproduced or presented as desired (e.g., are at optimal visual quality).

At 1108, the control signal can be transmitted (e.g., automatically or dynamically, in real time), for example, to the barrier component. In an aspect, the barrier control component can transmit (e.g., communicate) the control signal to the barrier component. The barrier component can receive the control signal, and can select and implement a barrier pattern (in a corresponding barrier pattern mode) corresponding to the control signal. The barrier component can use the corresponding barrier pattern to process the 2-D video image to generate and present the processed video image (e.g., 2-D video image, 3-D stereoscopic video image, 3-D autostereoscopic video image) on the projector screen component for viewing by a viewer, as more fully disclosed herein.

Figure 12:
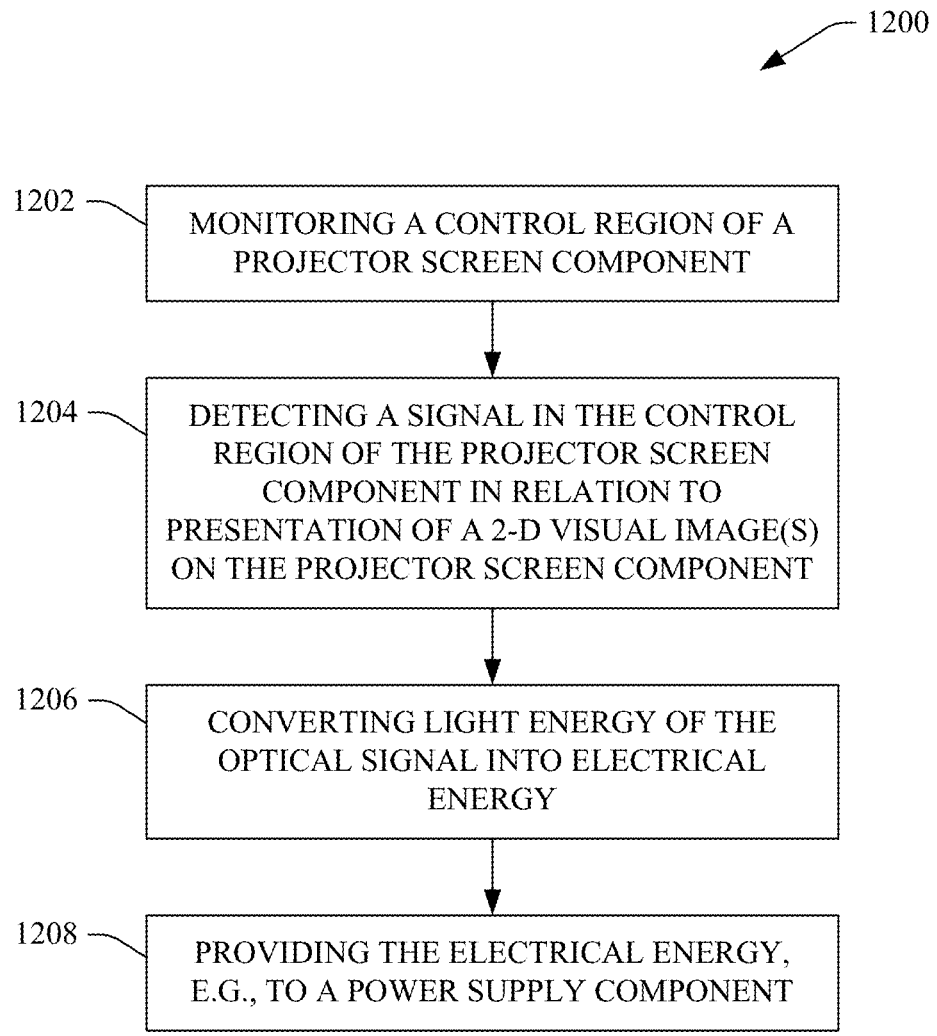
FIG. 12 presents a flow diagram of an example method that can generate power, in response to an optical signal associated with a visual image, to facilitate powering a barrier control component and/or associated components, in accordance with various embodiments and aspects of the disclosed subject matter.

FIG. 12 presents a flow diagram of an example method 1200 that can generate power, in response to an optical signal associated with a visual image, to facilitate powering a barrier control component and/or associated components, in accordance with various embodiments and aspects of the disclosed subject matter. In some embodiments, the method 1200 can be implemented concurrently with method 1100.

At 1202, a control region of a projector screen component can be monitored. The barrier control component can include a sensor component that can monitor the control region of the projector screen component to facilitate detecting optical signals (e.g., optical or light signals or patterns) that can be presented in the control region in relation to presentation of the 2-D video image(s) on the projector screen component.

The 2-D video image(s) can include a signal region, wherein an optical signal can be embedded in the 2-D video image(s) and can correspond to the type of video content (e.g., normal 2-D content, enhanced 2-D content) contained in the 2-D video image(s) to facilitate switching the barrier component to a barrier pattern that corresponds to the type of video content being projected.

At 1204, an optical signal can be detected (e.g., automatically or dynamically, in real time) in the control region of the projector screen component in relation to presentation of the 2-D visual image(s) on the projector screen component. The 2-D visual image(s) can be presented on the projector screen component. The signal embedded in the 2-D visual image(s) can be presented in the control region of the projector screen component. The sensor component can detect or sense the signal presented (e.g., emitted) in the control region of the projector screen component.

At 1206, light energy of the optical signal can be converted into electrical energy. The sensor component can include a sensor array comprising a subset of sensors that can sense or detect the optical signals. In some implementations, the subset of sensors can be a subset of solar cells that can detect the optical signal, and can convert the light energy of the optical signal into electrical energy, for example, via a photovoltaic effect process or indirectly by first converting the light energy into heat energy and converting the heat energy to electrical energy.

At 1208, the electrical energy can be provided, for example, to a power supply component. The sensor component can provide the electrical energy (e.g., electrical power) to the power supply component of the barrier control component. The power supply component can store the electrical energy in a battery component and/or can provide some or all of the electrical energy to other components of the barrier control component or to other components (e.g., barrier component, projector screen component) to facilitate powering one or more components associated with the barrier control component.

Figure 13:
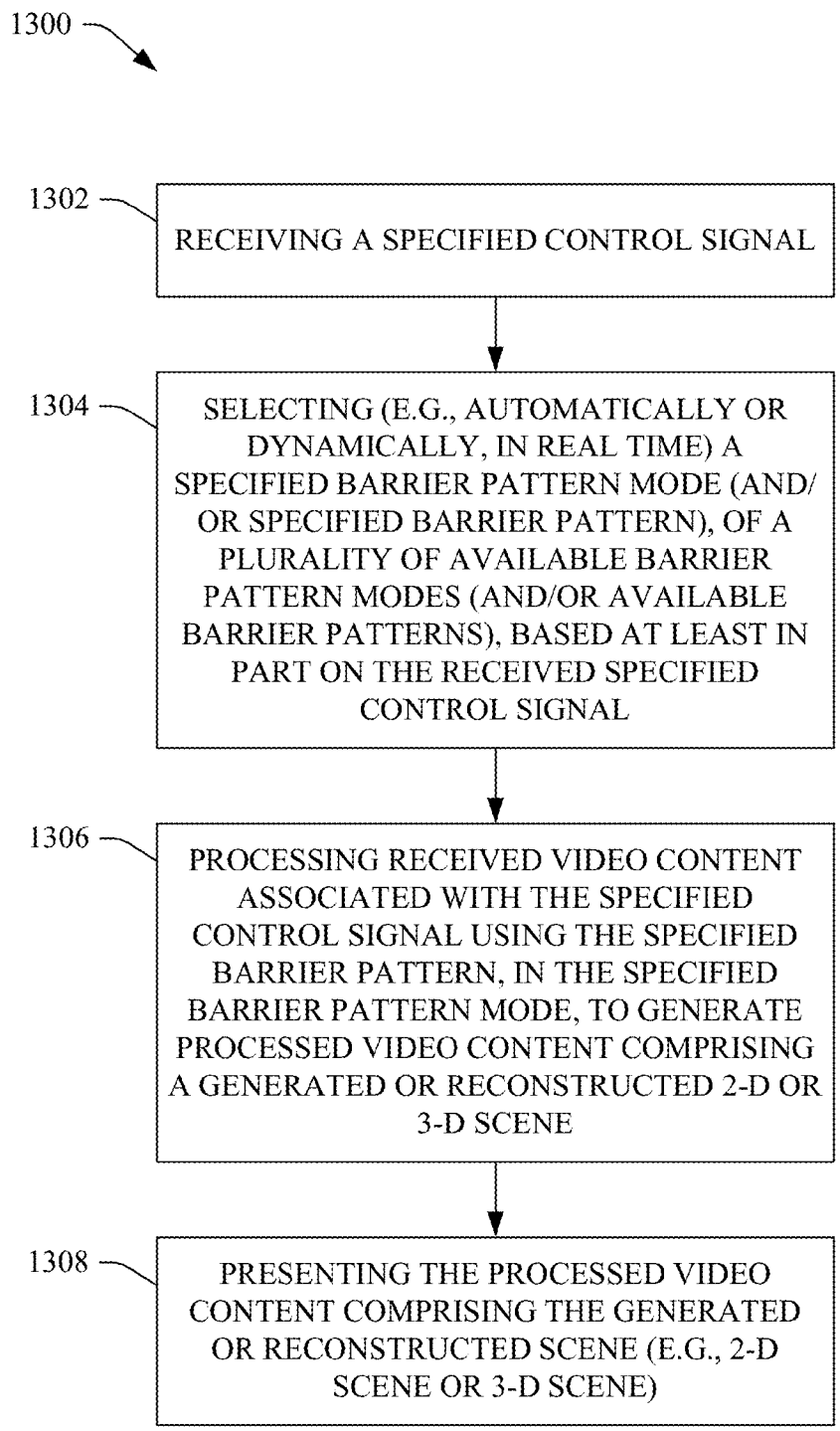
FIG. 13 presents a flow diagram of an example method that can utilize a received control signal to facilitate controlling (e.g., automatically or dynamically, in real time) switching or selecting of a particular display mode of a plurality of available display modes of a barrier component in accordance with various embodiments and aspects of the disclosed subject matter.

FIG. 13 illustrates a flow diagram of an example method 1300 that can utilize a received control signal to facilitate controlling (e.g., automatically or dynamically, in real time) switching or selecting of a particular display mode of a plurality of available display modes of a barrier component in accordance with various embodiments and aspects of the disclosed subject matter. The method 1300 can be implemented by a barrier component, in response to receiving a control signal from a barrier control component, to facilitate controlling switching or selecting of a particular display mode of the plurality of available display modes to facilitate desirable display of video content by the projector screen component in conjunction with the barrier component.

At 1302, a control signal can be received. The barrier component can receive the control signal from the barrier control component in relation to controlling switching or selecting a barrier pattern mode (and/or corresponding barrier pattern) that can correspond to the control signal to facilitate processing video content being presented by the barrier component, in conjunction with the projector screen component, to a viewer(s).

At 1304, a barrier pattern mode (and/or corresponding barrier pattern), of a plurality of available barrier pattern modes (and/or corresponding available barrier patterns), can be identified (e.g., automatically or dynamically, in real time) based at least in part on the received control signal. In an aspect, the barrier component can analyze the control signal, and based at least in part on the information contained in the control signal, the barrier component can identify and select the barrier pattern mode (and/or corresponding barrier pattern) that corresponds with the information contained in the control signal. In some implementations, the barrier component can contain respective mappings of available control signals to available barrier pattern modes (and/or corresponding available barrier patterns). The barrier component can identify and select the barrier pattern mode (and/or corresponding barrier pattern) that is mapped to the control signal, based at least in part on the mapping information.

At 1306, received video content associated with the control signal can be processed using the identified barrier pattern, in the identified barrier pattern mode, to generate processed video content comprising a generated or reconstructed 2-D or 3-D scene. For example, normal 2-D video content can be processed using a transparent barrier pattern (e.g., barrier pattern in transparent barrier pattern mode) that will pass the normal 2-D video content through without affecting or altering the normal 2-D video content. As another example, enhanced 2-D video content, which can be used to reconstruct a 3-D scene, can be processed using an applicable 3-D type barrier pattern (e.g., barrier pattern for 3-D stereoscopic video content, barrier pattern for 3-D autostereoscopic video content) while in the corresponding barrier pattern mode, as more fully disclosed herein, to generate or reconstruct 3-D video content of a 3-D scene.

At 1308, processed video content, comprising the generated or reconstructed scene (e.g., 2-D scene or 3-D scene), can be presented. For example, the barrier component can present the processed video content comprising the generated or reconstructed scene as an output, which can be viewed by a viewer.

Figure 14:
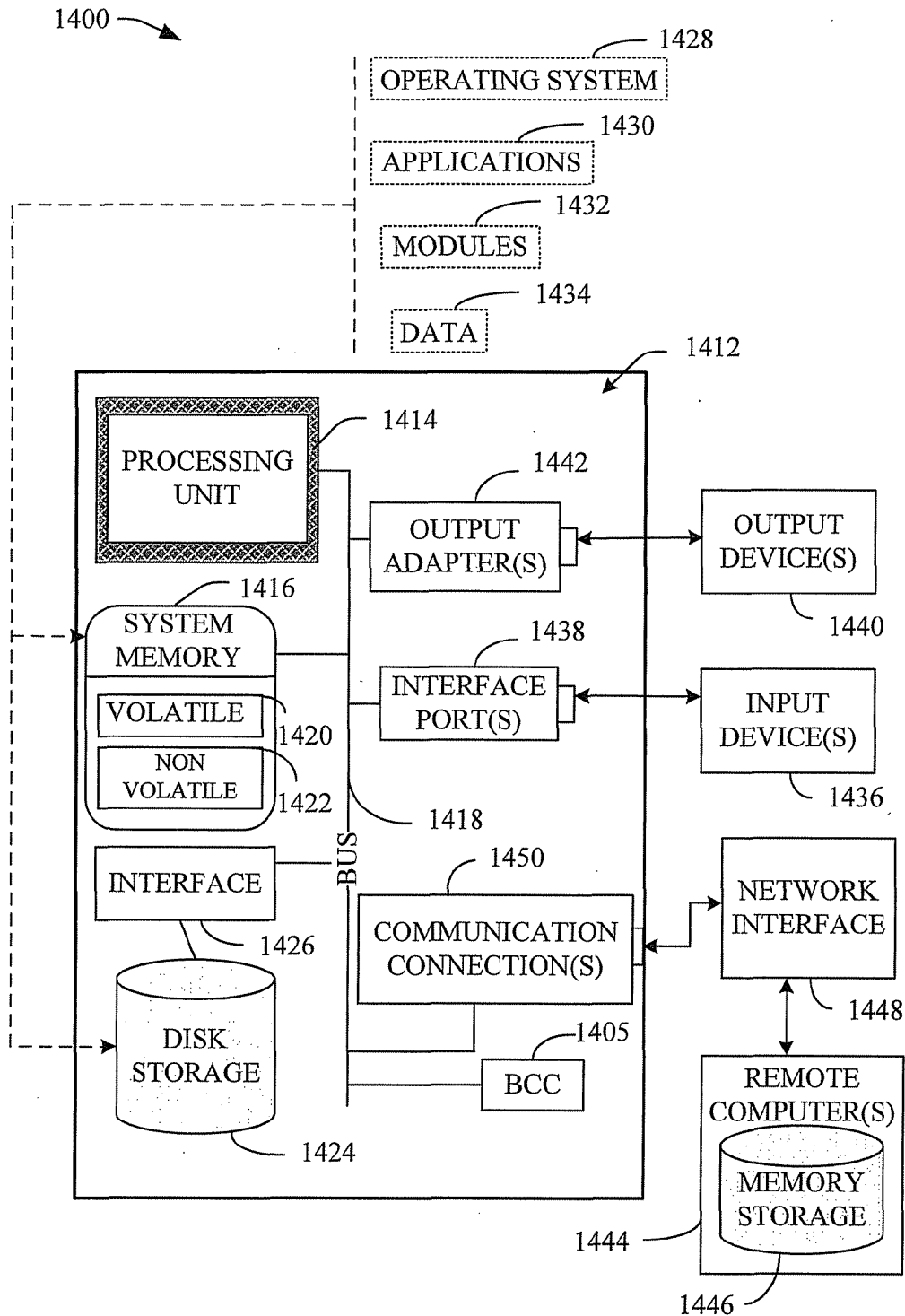
FIG. 14 is a schematic block diagram illustrating a suitable operating environment.
Figure 15:
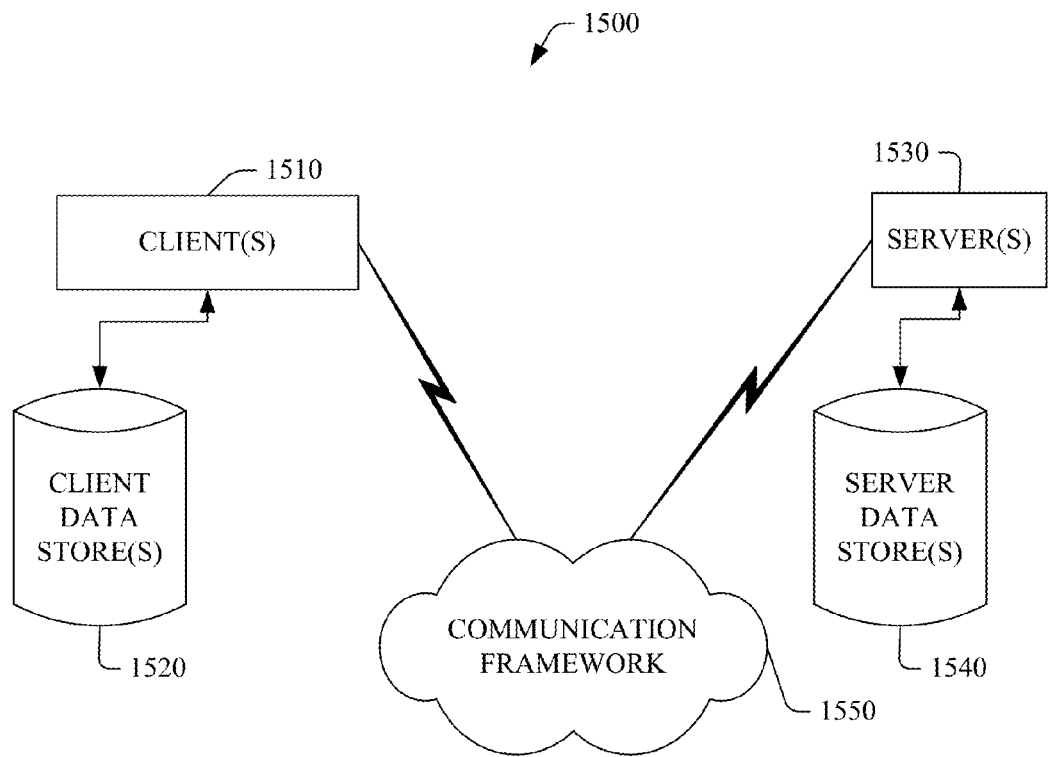
FIG. 15 is a schematic block diagram of a sample-computing environment.

In order to provide a context for the various aspects of the disclosed subject matter, FIGS. 14 and 15 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject disclosure also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone), microprocessor-based or programmable consumer or industrial electronics, and the like. The illustrated aspects may also be practiced in distributed computing environments where tasks are performed by remote processing devices that are linked through a communications network. However, some, if not all aspects of the subject disclosure can be practiced on stand-alone computers. In a distributed computing environment, program modules may be located in both local and remote memory storage devices.

With reference to FIG. 14, a suitable environment 1400 for implementing various aspects of the claimed subject matter includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable programmable ROM (EEPROM), or flash memory. Volatile memory 1420 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1412 also includes removable/non-removable, volatile/nonvolatile computer storage media. FIG. 14 illustrates, for example, a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used, such as interface 1426).

It is to be appreciated that FIG. 14 describes software that acts as an intermediary between users and the basic computer resources described in the suitable operating environment 1400. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the claimed subject matter can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

In some implementations, the computer 1412 can include or be associated with (e.g., removably connected to) a barrier control component (BCC) 1405 that can control switching of display modes and corresponding barrier patterns by a barrier component in response to detected signals in a control region of a projector screen component in relation to presentation of video content on the projector screen component. In some implementations, the computer 1412 can be removably connected to the barrier control component 1405, wherein the computer 1412 and barrier control component 1405 can be connected at desired times to facilitate performance of operations by the barrier control component 1405, updating or modifying of the barrier control component 1405 or associated barrier component (e.g., updating or modifying of control signals, display modes, barrier patterns, mappings, etc.), aligning the sensor component of the barrier control component with the control region of the projector screen component, etc.

In other embodiments, the system 1400 can be used to embed respective signals in respective signal regions of respective visual images to facilitate identifying the type of video content that is contained in the respective visual images. The visual images, comprising the respective signals in the respective signal regions, can be presented by a projector system to the projector screen component.

FIG. 15 is a schematic block diagram of a sample-computing environment 1500 with which the subject disclosure can interact. The system 1500 includes one or more client(s) 1510. The client(s) 1510 can be hardware and/or software (e.g., threads, processes, computing devices). The system 1500 also includes one or more server(s) 1530. Thus, system 1500 can correspond to a two-tier client server model or a multi-tier model (e.g., client, middle tier server, data server), amongst other models. The server(s) 1530 can also be hardware and/or software (e.g., threads, processes, computing devices). The servers 1530 can house threads to perform transformations by employing the subject disclosure, for example. One possible communication between a client 1510 and a server 1530 may be in the form of a data packet transmitted between two or more computer processes.

The system 1500 includes a communication framework 1550 that can be employed to facilitate communications between the client(s) 1510 and the server(s) 1530. The client (s) 1510 are operatively connected to one or more client data store(s) 1520 that can be employed to store information local to the client(s) 1510. Similarly, the server(s) 1530 are operatively connected to one or more server data store(s) 1540 that can be employed to store information local to the servers 1530.

It is to be appreciated and understood that components (e.g., projector screen component, projector component, barrier component, barrier control component, sensor component, power supply unit, etc.), as described with regard to a particular system or method, can include the same or similar functionality as respective components (e.g., respectively named components or similarly named components) as described with regard to other systems or methods disclosed herein.

As utilized herein, terms "component," "system," "unit", "array", and the like, can refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein can encompass a computer program accessible from any computer-readable device, carrier, or media. For example, computer readable media can include, but is not limited to, magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the disclosed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system, comprising:
   a barrier control component configured to generate a control signal, based at least in part on a signal sensed from a control region of a projector screen component that presents video content received from a projector component, and transmit the control signal to a barrier component associated with the projector screen component to facilitate controlling selection of a display mode and a corresponding barrier pattern that correspond to the control signal and a type of the video content being presented; and
   a sensor component configured to monitor the control region and sense the signal emitted from the control region,
      wherein the signal is an optical signal that presents multiple bits of data that are indicative of the display mode and the corresponding barrier pattern to use to process at least a portion of the video content, wherein the sensor component comprises a set of light sensors comprising at least a first light sensor and a second light sensor, wherein a number of light sensors in the set of light sensors is same as a bit number that represents a total number of the bits of the data of the multiple bits of the data, wherein the first light sensor and the second light sensor sense and identify the optical signal to identify the control signal and at a same time convert light energy of the optical signal to electrical energy that is used to supply power to at least one of the barrier control component or the barrier component to facilitate the controlling the selection of the display mode and the corresponding barrier pattern, wherein the barrier control component generates the control signal in response to the signal being sensed in the control region in conjunction with the presentation of the first visual image on the projector screen component, wherein the barrier component maintains the display mode and the corresponding barrier pattern based at least in part on no signal being sensed in the control region in conjunction with a second visual image of the video content being presented on the projector screen component after the first visual image, and wherein the barrier control component generates a different control signal in response to a different signal being sensed in the control region in conjunction with a third visual image of the video content being presented on the projector screen component after the second image, to facilitate selection of a different display mode and a different corresponding barrier pattern.

2. The system of claim 1, wherein the optical signal is a first optical signal of a plurality of available optical signals, and wherein the barrier control component is further configured to analyze the first optical signal to identify the control signal from a plurality of available control signals.

3. The system of claim 2, wherein the barrier control component is further configured to identify the control signal by an analysis of a mapping of respective optical signals to respective control signals, wherein the first optical signal is mapped to the control signal.

4. The system of claim 2, wherein at least the first light sensor of the set of light sensors is configured to face and be aligned with the control region of a projection screen of the projector screen component to facilitate the sensing of the first optical signal emitted from the control region.

5. The system of claim 1, wherein at least a subset of the set of light sensors comprises one or more solar cells configured to process the first optical signal to convert the light energy of the first optical signal into the electrical energy.

6. The system of claim 5, further comprising a power supply component configured to receive the electrical energy from the one or more solar cells, and to store the electrical energy in a battery component or provide the electrical energy to at least one of a processor component of the barrier control component, the barrier component, or the projector screen component.

7. The system of claim 6, wherein the barrier control component, the barrier component, and the projector screen component are integrated into a stand-alone unit, and wherein the power supply component is further configured to provide the power to at least one of the processor component of the barrier control component, the barrier component, or the projector screen component, without external electrical connection or external power supply to the stand-alone unit.

8. The system of claim 1, wherein the corresponding barrier pattern is a first barrier pattern of a plurality of available barrier patterns, and the display mode is a first display mode of a plurality of available display modes.

9. The system of claim 8, wherein the type of the video content is two-dimensional video content, wherein the first display mode is a transparent barrier pattern mode of the first barrier pattern, the transparent barrier pattern mode causes the first barrier pattern to be transparent to allow the two-dimensional video content to pass through without the two-dimensional video content being altered by the first barrier pattern, and the two-dimensional video content is output from the first barrier pattern and presented to be viewed.

10. The system of claim 8, wherein the type of the video content is a first type of enhanced two-dimensional video content comprising multiple respective two-dimensional views that are combined to produce a reconstructed three-dimensional scene, wherein the first display mode is at least one of a partially opaque stereoscopic-type barrier pattern mode of the first barrier pattern or a partially opaque autostereoscopic-type barrier pattern mode of the first barrier pattern, and wherein at least one of the partially opaque stereoscopic-type barrier pattern mode or the partially opaque autostereoscopic-type barrier pattern mode causes the first barrier pattern to be partially opaque wherein, in response to the enhanced two-dimensional video content being received by the first barrier pattern, the first barrier pattern directs respective illuminating pixels along respective directions corresponding to the respective two-dimensional views of the reconstructed three-dimensional scene represented by the respective two-dimensional views, and the reconstructed three-dimensional scene is output from the first barrier pattern and presented to be viewed.

11. The system of claim 10, wherein the enhanced two-dimensional video content comprises at least one of:
stereoscopic content that has two two-dimensional views of each scene portion of a three-dimensional scene being reconstructed to form the reconstructed three-dimensional scene, and wherein the first barrier pattern comprises a series of repeated columns of evenly spaced vertical opaque strips with a transparent space between adjacent vertical opaque strips, or
autostereoscopic content that has more than two two-dimensional views of each scene portion of a three-dimensional scene being reconstructed to form the reconstructed three-dimensional scene, and wherein the first barrier pattern comprises a plurality of slanted opaque strips that are repetitive or regularly spaced with a transparent space between adjacent slanted opaque strips.

12. The system of claim 1, wherein the barrier component is further configured to receive the control signal and select at least one of the display mode or the corresponding barrier pattern, based at least in part on the control signal, and wherein the barrier component is further configured to be aligned in relation to the projector screen component to facilitate reception of the video content by the barrier component.

13. The system of claim 1, wherein the barrier component is further configured to analyze the control signal and identify at least one of the barrier pattern mode or the corresponding barrier pattern that corresponds to the control signal.

14. The system of claim 1, wherein the barrier component is further configured to identify at least one of the display mode or the corresponding barrier pattern via an analysis of a mapping of respective control signals to respective display modes or respective barrier patterns, wherein the control signal is mapped to at least one of the display mode or the corresponding barrier pattern.

15. The system of claim 1, wherein the barrier component is further configured to control an amount of voltage applied to the corresponding barrier pattern to control the selection of the display mode in response to the control signal.

16. The system of claim 1, wherein the barrier component is an active parallax barrier.

17. The system of claim 1, wherein the projector screen component is configured to comprise a two-dimensional projector screen and contain the control region in a portion of the two-dimensional projector screen.

18. The system of claim 17, wherein the two-dimensional projector screen is formed of at least one of a flexible material, a semi-rigid material, or a rigid material.

19. The system of claim 17, wherein the two-dimensional projector screen comprises a coating formed on the two-dimensional projector screen to facilitate presentation of the video content, wherein the coating is at least one of an optical coating, a diffusion coating, or a neutral coating.

20. The system of claim 17, wherein the two-dimensional projector screen receives the video content via rear projection of the video content from the projector component to the two-dimensional projector screen.

21. The system of claim 17, wherein the two-dimensional projector screen is a liquid crystal display (LCD), a light emitting diode (LED) display, a combination LCD-LED display, a plasma display, a plasma display panel (PDP), a digital light processing (DLP) display, or a cathode ray tube (CRT) display.

22. A method, comprising:
  detecting, by a set of light sensors, an optical signal, which is associated with a visual image that is part of video content, and is presented as a visual output from a control region associated with a projector screen that is presenting the visual image, wherein the optical signal presents multiple bits of data that are indicative of a barrier pattern mode and a corresponding barrier pattern to use to process at least a portion of the video content, wherein a number of light sensors in the set of light sensors is equal to a bit number that indicates a total number of the bits of the data of the multiple bits of the data;
  selecting a control signal, of a plurality of available control signals, based at least in part on information contained in the optical signal, in response to the optical signal being detected in the control region in conjunction with the presentation of the visual image on the projector screen, wherein use of the barrier pattern mode is continued in response to no signal being detected in the control region in conjunction with presentation of a second visual image of the video content on the projector screen subsequent to the presentation of the visual image;
  transmitting the control signal to a barrier component to facilitate controlling selecting the barrier pattern mode from a plurality of available barrier pattern modes and the corresponding barrier pattern from a plurality of available barrier patterns, to facilitate processing the visual image for presentation;
  converting, by the set of light sensors, light energy of the optical signal to electrical power that is supplied to at least the barrier component to facilitate operation of the barrier component in connection with the selecting of the barrier pattern mode and the corresponding barrier pattern, wherein the converting the light energy is performed by respective light sensors of the set of light sensors concurrently with the detecting the optical signal by the respective light sensors; and
  subsequently selecting another control signal, of the plurality of available control signals, in response to another optical signal being detected in the control region in conjunction with presentation of a third visual image of the video content on the projector screen subsequent to the presentation of the second visual image.

23. The method of claim 22, further comprising:
forming a signal region on the visual image;
selecting the optical signal from a plurality of available optical signals based at least in part on type of video content that is in the visual image, wherein the type of video content comprises one of normal two-dimensional video content, first enhanced two-dimensional video content comprising stereoscopic video content, or second enhanced two-dimensional video content comprising autostereoscopic video content;
embedding the optical signal in the signal region of the visual image; and
presenting the visual image, comprising the optical signal contained in the signal region, to the projector screen, wherein the optical signal contained in the signal region is presented on the control region.

24. The method of claim 22, further comprising:
monitoring information being presented by the control region;
receiving the visual image associated with video content by the projector screen via rear projection from a rear video projector component; and
identifying the control signal from a plurality of available control signals, based at least in part on analyzing the optical signal detected in the control region.

25. The method of claim 22, further comprising:
providing the electrical power to at least one of a battery, the barrier component, or a processor associated with a barrier control component.

26. The method of claim 25, further comprising:
storing the electrical power in the battery; and
transferring at least a portion of the electrical power to at least one of the barrier component, the projector screen, or the processor to facilitate powering at least one operation being performed by at least one of the barrier component, the projector screen, or the processor.

27. The method of claim 25, further comprising:
integrating the barrier control component, the barrier component, and the projector screen into a stand-alone unit, wherein the providing the electrical power further comprises providing the electrical power to at least one of the barrier component, the projector screen, or the processor, without external electrical connection or external power supply being connected to the stand-alone unit.

28. The method of claim 22, further comprising:
receiving the control signal;
selecting at least one of the barrier pattern mode or the corresponding barrier pattern, based at least in part on the control signal;
processing the visual image using the corresponding barrier pattern in the barrier pattern mode to generate processed video content comprising a two-dimensional scene or a reconstructed three-dimensional scene depending in part on a type of video content of the visual image, wherein the type of the video content is one of normal two-dimensional video content, first enhanced two-dimensional video content comprising stereoscopic video content, or second enhanced two-dimensional video content comprising autostereoscopic video content; and presenting the processed video content via the barrier component.

29. The method of claim 28, wherein the selecting at least one of the barrier pattern mode or the corresponding barrier pattern further comprises selecting at least one of the barrier pattern mode or the corresponding barrier pattern in response to determining that the type of the video content of the visual image is the normal two-dimensional video content, wherein the barrier pattern mode is a transparent barrier pattern mode that causes the corresponding barrier pattern to be transparent to allow the visual image to pass through the corresponding barrier pattern without the visual image being altered by the corresponding barrier pattern, and wherein the method further comprises presenting the visual image, which is the normal two-dimensional video content, as an output from the corresponding barrier pattern to facilitate viewing of the visual image.

30. The method of claim 28, wherein the selecting at least one of the barrier pattern mode or the corresponding barrier pattern further comprises selecting at least one of the barrier pattern mode or the corresponding barrier pattern in response to the type of the video content of the visual image being enhanced two-dimensional video content comprising stereoscopic video content comprising two respective two-dimensional views of a three-dimensional scene associated with the visual image, wherein the barrier pattern mode is a stereoscopic-type barrier pattern mode that causes the specified barrier pattern to be a stereoscopic-type barrier pattern, and the stereoscopic-type barrier pattern is a partially opaque barrier pattern comprising a series of repeated columns of evenly spaced vertical opaque strips with a transparent space in between adjacent vertical opaque strips, and wherein the method further comprises:
directing respective illuminating pixels associated with the enhanced two-dimensional video content of the visual image along respective directions corresponding to the respective two-dimensional views of the reconstructed three-dimensional scene that the respective two-dimensional views represent; wherein the presenting the processed video content further comprises presenting the processed video content, comprising the reconstructed three-dimensional scene, as an output from the corresponding barrier pattern to facilitate viewing of the processed video content.

31. The method of claim 28, further comprising:
selecting at least one of the barrier pattern mode or the corresponding barrier pattern in response to the type of the video content of the visual image being enhanced two-dimensional video content comprising autostereoscopic video content comprising more than two respective two-dimensional views of a three-dimensional scene associated with the visual image, wherein the barrier pattern mode is an autostereoscopic-type barrier pattern mode that causes the corresponding barrier pattern to be an autostereoscopic-type barrier pattern, and the autostereoscopic-type barrier pattern is a partially opaque barrier pattern comprising a plurality of slanted opaque strips that are at least one of repetitive or regularly spaced with a transparent space between adjacent slanted opaque strips;

directing respective illuminating pixels associated with the enhanced two-dimensional video content of the visual image along respective directions corresponding to the respective two-dimensional views of the reconstructed three-dimensional scene that the respective two-dimensional views represent; and presenting the processed video content comprising the reconstructed three-dimensional scene as an output from the corresponding barrier pattern to facilitate viewing of the processed video content.

32. The method of claim 22, further comprising:
in response to the control signal, controlling an amount of voltage applied to the corresponding barrier pattern; and
controlling selection of the barrier pattern mode based at least in part on the amount of voltage applied to the corresponding barrier pattern.

33. A system, comprising:
means for sensing an optical signal, which is associated with a video image that is part of video content, in a control region of a projector screen component in relation to presentation of the video image on the projector screen component, wherein the optical signal presents multiple bits of data that are indicative of a barrier pattern mode and a corresponding barrier pattern to use to process at least a portion of the video content, wherein the means for sensing comprises a set of means for light-wave sensing comprising at least a first means for light-wave sensing a first portion of light waves of the optical signal and a second means for light-wave sensing a second portion of the light waves of the optical signal, wherein a number of means for light-wave sensing in the set of means for light-wave sensing is equal to a bit number representing a total number of the bits of the data of the multiple bits of the data, wherein the means for sensing further comprises means for converting light energy of the optical signal to electrical energy that is used to supply power to at least one of a barrier control component or a barrier component to facilitate operation of at least one of the barrier control component or the barrier component to facilitate controlling selecting of the barrier pattern mode and the corresponding barrier pattern, wherein the light energy is converted to the electrical energy simultaneously with the optical signal being sensed;

means for generating a control signal, of a plurality of available control signals, in response to the optical signal being sensed in the control region in connection with the presentation of the video image, wherein the barrier pattern mode and the corresponding barrier pattern are maintained in response to no optical signal being sensed in the control region in connection with presentation of a second video image of the video content on the projector screen component subsequent to the presentation of the video image, and wherein the means for generating further comprises means for subsequently generating a different control signal, of the plurality of available control signals, in response to a different optical signal being sensed in the control region in connection with presentation of a third video image of the video content on the projector screen component subsequent to the presentation of the second video image; and means for transmitting the control signal to the barrier component to facilitate controlling selecting the barrier pattern mode and the corresponding barrier pattern suitable for processing the video image from a plurality of available barrier pattern modes and a plurality of available barrier patterns, wherein the control signal is selected based at least in part on information contained in the optical signal.

34. A non-transitory computer readable storage medium comprising computer executable instructions that, in response to execution by a system comprising a processor, cause the system to perform operations comprising:

facilitating detecting an optical signal, associated with a video image of video content, in a control region of a projector screen by a set of light sensors, comprising a first light sensor and a second light sensor, in relation to presentation of the video image on the projector screen, wherein the optical signal represents multiple bits of data that are indicative of a barrier pattern mode and an associated barrier pattern to use to process at least a portion of the video content, wherein a number of light sensors in the set of light sensors is same as a bit number representing a total number of the bits of the data of the multiple bits of the data;

selecting a control signal of a plurality of available control signals based at least in part on information contained in the optical signal, in response to the optical signal being detected in the control region in conjunction with the presentation of the video image;

transmitting the control signal in real time to a barrier component to facilitate selecting the barrier pattern mode and the associated barrier pattern from a plurality of available barrier pattern modes and a plurality of available barrier patterns, wherein the barrier pattern mode and the associated barrier pattern facilitate processing the video image in accordance with the optical signal, which corresponds to a type of the video content of the video image, wherein the barrier pattern mode and the associated barrier pattern are continued based at least in part on no optical signal being detected in the control region in conjunction with presentation of a second video image of the video content on the projector screen, and wherein a different control signal is selected in response to a different optical signal being detected in the control region in conjunction with presentation of a third video image of the video content on the projector screen; and facilitating converting light energy of the optical signal to electrical power by the first light sensor and the second light sensor, wherein the electrical power is supplied to at least the barrier component to facilitate operation of the barrier component in connection with the selecting of the barrier pattern mode and the associated barrier pattern, and wherein the converting the light energy by the first light sensor and the second light sensor is performed concurrently with the detecting the optical signal by first light sensor and the second light sensor.

* * * * *